US012189140B2

(12) United States Patent
Endo et al.

(10) Patent No.: US 12,189,140 B2
(45) Date of Patent: Jan. 7, 2025

(54) LENS STRUCTURE AND OPTICAL CONNECTION STRUCTURE

(71) Applicant: Nippon Telegraph and Telephone Corporation, Tokyo (JP)

(72) Inventors: Jun Endo, Tokyo (JP); Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 818 days.

(21) Appl. No.: 17/430,799

(22) PCT Filed: Jan. 31, 2020

(86) PCT No.: PCT/JP2020/003697
§ 371 (c)(1),
(2) Date: Aug. 13, 2021

(87) PCT Pub. No.: WO2020/166386
PCT Pub. Date: Aug. 20, 2020

(65) Prior Publication Data
US 2022/0075100 A1    Mar. 10, 2022

(30) Foreign Application Priority Data

Feb. 15, 2019    (JP) .................................. 2019-025401

(51) Int. Cl.
*G02B 3/04*    (2006.01)
*G02B 6/30*    (2006.01)
*G02B 6/32*    (2006.01)

(52) U.S. Cl.
CPC ............... *G02B 3/04* (2013.01); *G02B 6/305* (2013.01); *G02B 6/32* (2013.01)

(58) Field of Classification Search
CPC ............. G02B 3/04; G02B 6/32; G02B 6/305
See application file for complete search history.

(56) References Cited

U.S. PATENT DOCUMENTS 6,266,476 B1 *    7/2001    Shie ....................... F21S 43/249
                                                     359/566
10,194,788 B2 *    2/2019    Vance ................ A61B 1/00096
(Continued)

FOREIGN PATENT DOCUMENTS

JP        S62244002 A    10/1987
JP        201562639 A     4/2015
(Continued)

OTHER PUBLICATIONS

Xiaojie, Y. et al., "Design and Simulation Analysis of Spot-Size Converter in Silicon-On-Insulator," CLEO, Aug. 31, 2009, 2 pages.

*Primary Examiner* — Ryan A Lepisto
*Assistant Examiner* — Erin D Chiem
(74) *Attorney, Agent, or Firm* — Slater Matsil, LLP

(57) ABSTRACT

An embodiment lens structure body includes a microlens portion of double-sided asymmetric aspherical shape having a refraction surface on an illuminant side and a refraction surface on an emission side so as to be opposed to the refraction surface, and marker portions formed so as to be joined to both ends of the microlens portion in a direction perpendicular to an optical axis.

8 Claims, 18 Drawing Sheets

(56) References Cited

U.S. PATENT DOCUMENTS

| | | | |
|---|---|---|---|
| 10,379,293 B2 | 8/2019 | Nakazuru et al. | |
| 11,169,446 B2 * | 11/2021 | Dietrich | G02B 6/305 |
| 2009/0314929 A1 * | 12/2009 | Lee | G02B 6/02033 |
| | | | 250/227.28 |
| 2016/0077338 A1 * | 3/2016 | Robbins | G02B 27/4205 |
| | | | 359/489.08 |

FOREIGN PATENT DOCUMENTS

| | | |
|---|---|---|
| JP | 2017134225 A | 8/2017 |
| WO | 2017072993 A1 | 5/2017 |

* cited by examiner

LENS STRUCTURE AND OPTICAL CONNECTION STRUCTURE

CROSS-REFERENCE TO RELATED APPLICATIONS

This patent application is a national phase filing under section 371 of PCT/JP2020/003697, filed Jan. 31, 2020, which claims the priority of Japanese patent application no. 2019-025401, filed Feb. 15, 2019, each of which is incorporated herein by reference in its entirety.

TECHNICAL FIELD

The present invention relates to a lens structure body and an optical interconnection structure for coupling optical waveguides mutually different in mode field diameter.

BACKGROUND

Si photonics, in which photoelectric devices are collectively integrated on a silicon (Si) substrate, is attracting attention. In this Si photonics, there is a demand for an optical interconnection technique capable of realizing an efficient mode field coupling between a Si waveguide constituting a photoelectric device and an optical fiber. Since the Si waveguide and the optical fiber are greatly different in mode field diameter, a mode field conversion structure such as a taper structure or a grating structure is formed in the Si waveguide (see Non-Patent literature 1).

However, the mode field of the Si waveguide may not be sufficiently coupled with the mode field of the optical fiber due to variations in manufacturing of the mode field conversion structure such as SSC (Spot-Size Converter) formed in the Si waveguide. The light wave emitted from the Si waveguide includes a radiation mode travelling in a direction away from the optical axis, and as a result, the coupling efficiency with the fiber deteriorates.

Part (a) of FIG. 21 is a cross-sectional diagram illustrating a conventional optical interconnection structure having an incomplete conversion structure, and part (b) of FIG. 21 is a diagram illustrating a normalized power distribution $|E|^2$ of the conventional optical interconnection structure (in which E is electric field). The optical interconnection structure illustrated in FIG. 21(a) is the one obtained by bonding an end face of a Si waveguide 300 and an end face of an optical fiber 301 with an adhesive 302 in a state they abut each other. In the example illustrated in FIG. 21(a), the Si waveguide 300 and the optical fiber 301 are spaced by 5 µm. The adhesive 302 plays the role of matching the refractive index between the Si waveguide 300 and the optical fiber 301. In FIG. 21, the z-axis direction is a propagation direction of light, and the y-axis direction is a direction perpendicular to the z-axis direction and is a thickness direction of the waveguide.

FIG. 22 is a diagram illustrating a representative mode in a fiber plane of the optical interconnection structure illustrated in FIG. 21. In FIG. 22, indicated are a propagation mode light intensity distribution 303 at z-coordinate zref=64 µm on a reference plane and a 0th-order eigenmode light intensity distribution 304 at zref=64 µm.

FIG. 23 is a diagram illustrating reference plane position dependency in coupling efficiency of the optical interconnection structure illustrated in FIG. 21. Here, the z-coordinate zref of the reference plane is swept from the vicinity of the fiber end face in the light propagation direction.

According to FIG. 23, in a range from the fiber end face (the position where zref is about 22 µm) to a position separated by approximately 50 µm (zref=70 µm) in the light propagation direction, the coupling efficiency between the Si waveguide 300 and the optical fiber 301 is about −4 dB to −3 dB, and it is understood that coupling efficiency is deteriorated.

CITATION LIST

Non-Patent Literature

Non-Patent Literature 1: Yin Xiaojie, Wu Yuanda, Hu Xiongwei, "Design and Simulation Analysis of Spot-Size Converter in Silicon-On-Insulator", CLEO/Pacific Rim 2009.

SUMMARY

Technical Problem

Embodiments of the present invention can solve the above problem, and provide a lens structure body and an optical interconnection structure that can improve the coupling efficiency between two optical waveguides that are different in mode field diameter.

Means for Solving the Problem

The lens structure body of embodiments of the present invention includes a lens portion having a first refraction surface on an illuminant side and a second refraction surface on an emission side so as to be opposed to the first refraction surface, wherein when z represents the coordinate in a light propagation direction, y represents the coordinate in a height direction perpendicular to an optical axis of the lens portion, D represents the size of the lens portion in the height direction, $l_a$ represents the distance from a predetermined origin to an end of the first refraction surface in the light propagation direction, t represents the distance from the end of the first refraction surface to an end of the second refraction surface in the light propagation direction, $r_{a1}$ represents the radius of the first refraction surface in the height direction, $r_{b1}$ represents the radius of the first refraction surface in the light propagation direction, $r_{a2}$ represents the radius of the second refraction surface in the height direction, and $r_{b2}$ represents the radius of the second refraction surface in the light propagation direction, the first refraction surface satisfies Expression 1 below and the second refraction surface satisfies Expression 2 below.

Expression 1

$$z = z_c - r_{b1}\sqrt{1 - \left(\frac{y}{r_{a1}}\right)^2}$$

$$z_c = l_a + r_{b1}\sqrt{1 - \left(\frac{0.5D}{r_{a1}}\right)^2}$$

$$1.6D < r_{a1} < 2.1D$$

$$6.0D < r_{b1} < 7.4D$$

Expression 2

$$z = z_c + r_{b2}\sqrt{1 - \left(\frac{y}{r_{a2}}\right)^2}$$

-continued $$z_c = l_a + t - r_{b2}\sqrt{1 - \left(\frac{0.5D}{r_{a2}}\right)^2}$$

$1.8D < r_{a2} < 2.2D$ $3.6D < r_{b2} < 4.4D$

Further, one exemplary configuration of the lens structure body of embodiments of the present invention is characterized by further including a marker portion formed so as to be joined to at least one of both ends of the lens portion in the direction perpendicular to the optical axis.

Further, one exemplary configuration of the lens structure body of embodiments of the present invention is characterized in that at least a part of the marker portion is coated with a contrast medium.

Further, one exemplary configuration of the lens structure body of embodiments of the present invention is characterized by further including a substrate, and a support member formed on the substrate and supporting the lens portion so that the lens portion is arranged on the substrate at a distance.

Further, the optical interconnection structure of embodiments of the present invention includes a first waveguide, a second waveguide receiving light from the first waveguide, and a lens structure body arranged between an emission surface of the first waveguide and an incidence surface of the second waveguide, wherein one end face of a substrate of the lens structure body is in contact with an emission end face of the first waveguide, and the other end face of the substrate is in contact with an incidence end face of the second waveguide.

Further, in one exemplary configuration of the optical interconnection structure of embodiments of the present invention, the second waveguide has a mode field diameter larger than that of the first waveguide.

Further, one exemplary configuration of the optical interconnection structure of embodiments of the present invention is characterized by further including a light transmissive member having a refractive index smaller than that of the lens portion, a space between at least one of the first waveguide and the second waveguide and the lens portion of the lens structure body being filled with the light transmissive member.

Further, in one exemplary configuration of the optical interconnection structure of embodiments of the present invention, the light transmissive member is a resin adhesive.

Effects of Embodiments of the Invention

According to embodiments of the present invention, forming a lens portion into a double-sided asymmetric aspherical shape can improve the coupling efficiency between two optical waveguides mutually different in mode field diameter, in a case where a lens structure body including the lens portion is applied to an optical interconnection structure, when compared with the conventional optical interconnection structure. In embodiments of the present invention, applying the lens structure body to the optical interconnection structure can compensate for an incomplete mode-field converter of the waveguide on the illuminant side. Further, in embodiments of the present invention, the spherical aberration of the lens structure body can be improved, and the number of lenses can be further reduced to downsize the optical system.

Further, in embodiments of the present invention, the marker portion is provided so as to be joined to at least one of both ends of the lens portion in the direction perpendicular to the optical axis, and at least a part of the marker portion is coated with the contrast medium. Thus, it becomes possible to detect the position of the lens portion.

Further, in embodiments of the present invention, providing the substrate and the support member so as to constitute the lens structure body can fix the lens portion in the clearance between the waveguides.

Further, in embodiments of the present invention, providing the light transmissive member having a refractive index smaller than that of the lens portion, the space between at least one of the first waveguide and the second waveguide and the lens portion of the lens structure body being filled with the light transmissive member, can reduce the reflectance between the lens portion and at least one of the first and second waveguides.

DETAILED DESCRIPTION OF ILLUSTRATIVE EMBODIMENTS

Outline of Embodiments of the Invention

In embodiments of the present invention, a lens structure body is provided in the clearance between two optical waveguides different in mode field diameter, and is formed to include a lens portion having a double-sided asymmetric aspherical shape and shortening a connection distance between the waveguides, a support member for fixing the lens portion, and a substrate. The lens portion and the support member are formed of photocurable resin. Further, the lens structure body has a marker portion for detecting the position of the lens portion.

First Embodiment

Figure 1:
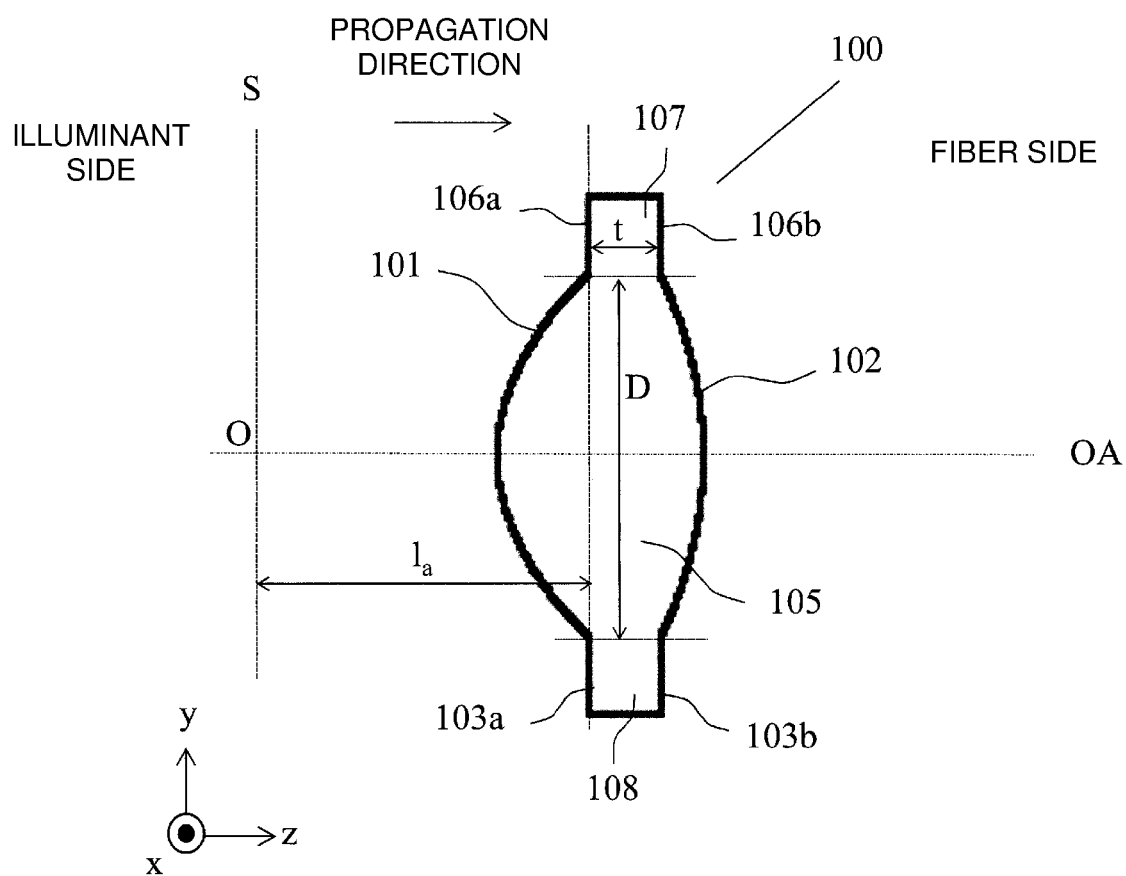
FIG. 1 is a cross-sectional diagram illustrating the shape of a lens structure body according to a first embodiment of the present invention.

Hereinafter, embodiments of the present invention will be described with reference to the accompanying drawings. FIG. 1 is a cross-sectional diagram illustrating the shape of a lens structure body according to a first embodiment of the present invention. In FIG. 1, the shape of a lens structure body 100 is defined in a rectangular coordinate system, in which the propagation direction of light is the z-axis direction and a surface orthogonal to the z-axis direction is an xy-surface. The origin O represents the coordinates of an illuminant, and OA represents the optical axis of the lens structure body 100. Further, in the drawing, the positive direction of y-axis is defined as an upward direction, and the negative direction is defined as a downward direction (vertical direction). In FIG. 1, S represents a waveguide emission surface.

The lens structure body 100 is configured by a microlens portion 105 having a refraction surface 101 (lens surface) on the illuminant side and a refraction surface 102 (lens surface) on the emission side so as to be opposed to the refraction surface 101, and marker portions 107 and 108 formed so as to be joined to both ends (upper and lower ends in the present embodiment) of the microlens portion 105 in the height direction perpendicular to the optical axis OA. The refraction surface 101 has a convex shape protruding toward the illuminant side, and the refraction surface 102 has a convex shape protruding in the propagation direction of light.

The microlens portion 105 of the lens structure body 100 contributes to the condensation of light, but the marker portions 107 and 108 do not contribute to the condensation of light. That is, surfaces 106$a$ and 106$b$ of the marker portion 107, which are perpendicular to the optical axis OA, and surfaces 103$a$ and 103$b$ of the marker portion 108, which are perpendicular to the optical axis OA, are non-refractive surfaces.

The portion where the microlens portion 105 is joined to the marker portions 107 and 108 has a length t in the z-axis direction. Each of the microlens portion 105 and the marker portions 107 and 108 is formed of a photocurable resin material.

It is desired that the refraction surface 101 of the microlens portion 105 satisfies conditional expressions of Expression (1-1) to Expression (1-4).

Expression (1-1)
$$z = z_c - r_{b1}\sqrt{1 - \left(\frac{y}{r_{a1}}\right)^2} \qquad (1\text{-}1)$$

Expression (1-2)
$$z_c = l_a + r_{b1}\sqrt{1 - \left(\frac{0.5D}{r_{a1}}\right)^2} \qquad (1\text{-}2)$$

Expression (1-3)
$$1.6D < r_{a1} < 2.1D \qquad (1\text{-}3)$$

Expression (1-4)
$$6.0D < r_{b1} < 7.4D \qquad (1\text{-}4)$$

Further, it is desired that the refraction surface 102 of the microlens portion 105 satisfies conditional expressions of Expression (2-1) to Expression (2-4).

Expression (2-1)
$$z = z_c + r_{b2}\sqrt{1 - \left(\frac{y}{r_{a2}}\right)^2} \qquad (2\text{-}1)$$

Expression (2-2)
$$z_c = l_a + r_{b2}\sqrt{1 - \left(\frac{0.5D}{r_{a2}}\right)^2} \qquad (2\text{-}2)$$

Expression (2-3)
$$1.8D < r_{a2} < 2.2D \qquad (2\text{-}3)$$

Expression (2-4)
$$3.6D < r_{b2} < 4.4D \qquad (2\text{-}4)$$

In the expressions, z represents the coordinate in the light propagation direction, and y represents the coordinate in the height direction perpendicular to the optical axis OA. Further, D represents the size (height) of the microlens portion 105 in the y-axis direction, and $l_a$ is a variable determining a working distance of the lens structure body 100 and is the distance from the origin O to the end of the refraction surface 101 in the z-axis direction. Further, t is the distance from the end of the refraction surface 101 to the end of the refraction surface 102 in the z-axis direction.

The refraction surface 101 and the refraction surface 102 can be expressed by asymmetric aspherical functions, and parameter ranges thereof are designated in Expression (1-1) to Expression (1-4) and Expression (2-1) to Expression (2-4). In the expressions, $r_{a1}$ is the radius of the refraction surface 101 (ellipsoidal surface) in the y-axis direction, and $r_{b1}$ is the radius of the refraction surface 101 in the z-axis direction. Further, $r_{a2}$ is the radius of the refraction surface 102 (ellipsoidal surface) in the y-axis direction, and $r_{b2}$ is the radius of the refraction surface 102 in the z-axis direction.

Basically, the microlens portion 105 is rotationally symmetric in the form with respect to the optical axis OA, but the radius in the x-direction and the radius in the y-direction may differ depending on in-plane asymmetry of a mode field shape of the illuminant.

In shape functions (Expression (1-1) to Expression (1-4), and Expression (2-1) to Expression (2-4)) of the lens structure body 100, the parameters are as follows, for example. Regarding the refraction surface 101, D=70 μm, $r_{a1}$=125 μm, $r_{b1}$=467 μm, and $l_a$=68 μm. Regarding the refraction surface 102, D=70 μm, $r_{a2}$=140 μm, $r_{b2}$=280 μm, and t=15 μm.

Figure 2:
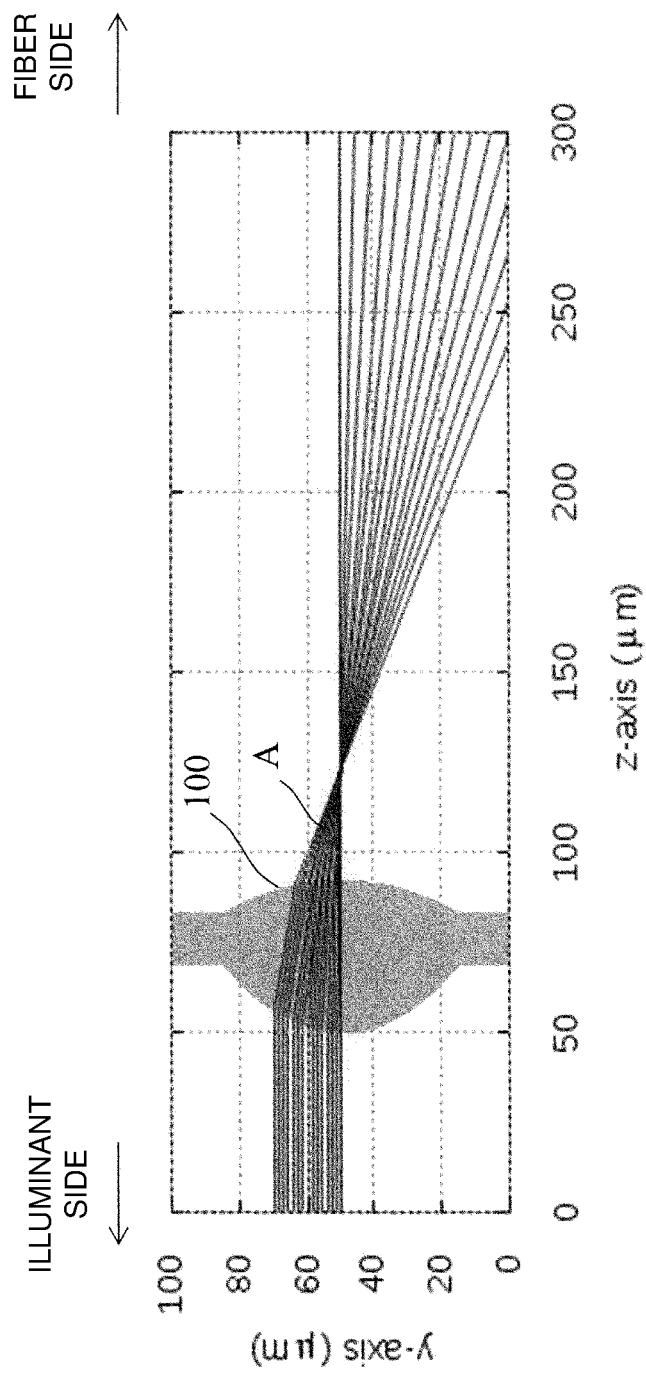
FIG. 2 is a diagram illustrating ray tracing calculation results obtained when collimated light is entered into the lens structure body according to the first embodiment of the present invention.

FIG. 2 is a diagram illustrating ray tracing calculation results obtained when collimated light is entered into the lens structure body 100. Here, the height of the collimated light in the y-axis direction from the optical axis OA is 0 to 20 μm. As indicated by a ray tracing result A, the position of the focal point of the lens structure body 100 in the z-axis direction is around 125 μm.

Figure 3:
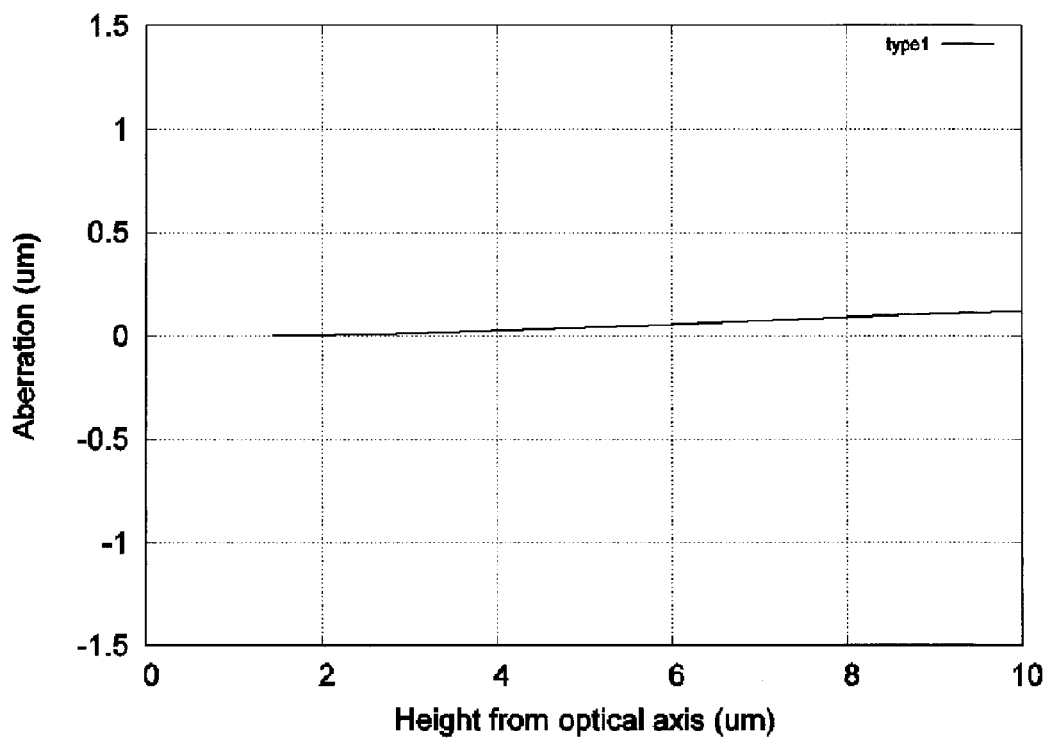
FIG. 3 is a diagram illustrating collimated light height dependency of spherical aberration of the lens structure body according to the first embodiment of the present invention.

FIG. 3 is a diagram illustrating collimated light height (corresponding to the mode field radius of the illuminant) dependency of the spherical aberration of the lens structure body 100, calculated based on the ray tracing calculation results illustrated in FIG. 2. In FIG. 3, the horizontal axis represents the height of the collimated light in the y-axis direction when the optical axis OA is 0 μm, and the vertical axis represents the spherical aberration of the lens structure body 100.

Figure 4:
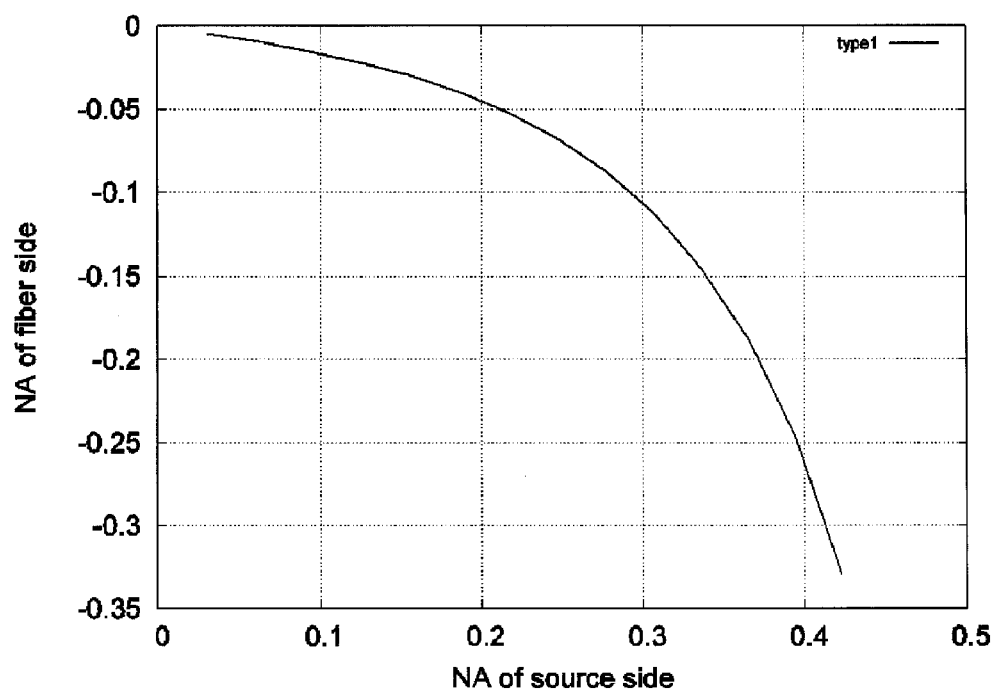
FIG. 4 is a diagram illustrating illuminant-side numerical aperture dependency of fiber-side numerical aperture in the first embodiment of the present invention.

FIG. 4 is a diagram illustrating illuminant-side numerical aperture dependency of fiber-side numerical aperture, calculated based on the ray tracing calculation results illustrated in FIG. 2. In FIG. 4, the horizontal axis represents the numerical aperture on the illuminant side, and the vertical axis represents the numerical aperture on the fiber side.

As described above, according to the lens structure body 100 of the present embodiment, the spherical aberration and the illuminant-side numerical aperture permissible range can be improved when compared with a ball lens having the same diameter.

In the present embodiment, as described in the following embodiment, applying the lens structure body 100 to the optical interconnection structure can improve the coupling efficiency, when compared with the conventional optical interconnection structure illustrated in FIG. 21(a). In the present embodiment, applying the lens structure body 100 to the optical interconnection structure can compensate for an incomplete mode-field converter (MFC) of the waveguide on the illuminant side.

Further, in the present embodiment, the spherical aberration of the lens structure body 100 can be improved. Further, in the present embodiment, the double-sided asymmetric aspherical shape of the lens structure body 100 can reduce the number of lenses. As a result, in the present embodiment, the optical system size can be reduced, when compared with a lens coupling system including no MFC.

Second Embodiment

Figure 5:
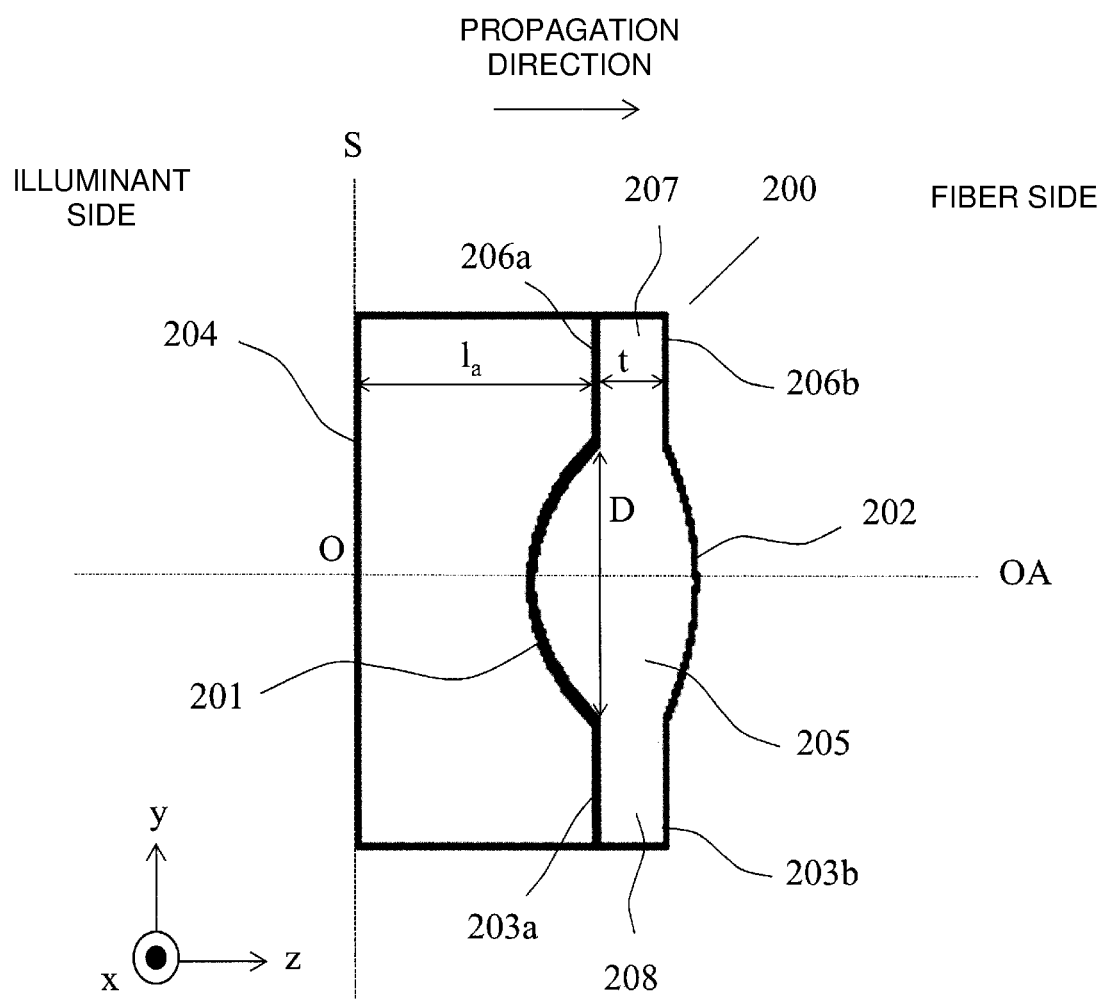
FIG. 5 is a cross-sectional diagram illustrating the shape of a lens structure body according to a second embodiment of the present invention.

Next, a second embodiment of the present invention will be described. FIG. 5 is a cross-sectional diagram illustrating the shape of a lens structure body according to the second embodiment of the present invention. Like the lens structure body 100, a lens structure body 200 of the present embodiment is configured by a microlens portion 205 having a convex refraction surface 201 (lens surface) protruding toward the illuminant side and a convex refraction surface 202 (lens surface) protruding in the propagation direction of light, and marker portions 207 and 208 formed so as to be joined to both ends (upper and lower ends in the present embodiment) of the microlens portion 105 in the direction perpendicular to the optical axis OA.

Like the lens structure body 100, the microlens portion 205 contributes to the condensation of light, but the marker portions 207 and 208 do not contribute to the condensation of light. That is, surfaces 206a and 206b of the marker portion 207, which are perpendicular to the optical axis OA, and surfaces 203a and 203b of the marker portion 208, which are perpendicular to the optical axis OA, are non-refractive surfaces. Like the lens structure body 100, each of the microlens portion 205 and the marker portions 207 and 208 is formed of a photocurable resin material.

Like the refraction surface 101, the refraction surface 201 satisfies the conditional expressions of Expression (1-1) to Expression (1-4). Like the refraction surface 102, the refraction surface 202 satisfies the conditional expressions of Expression (2-1) to Expression (2-4).

In the shape functions (Expression (1-1) to Expression (1-4), and Expression (2-1) to Expression (2-4)) of the lens structure body 200, the parameters are as follows, for example. Regarding the refraction surface 201, D=53 μm, $r_{a1}$=94 μm, $r_{b1}$=353 μm, and $l_a$=52 μm. Regarding the refraction surface 202, D=53 μm, $r_{a2}$=106 μm, $r_{b2}$=212 μm, and t=15 μm.

The refraction surface 201 is in contact with an adhesive layer 204 (light transmissive member) made of a material having a refractive index smaller than the refractive index of the microlens portion 205.

Figure 6:
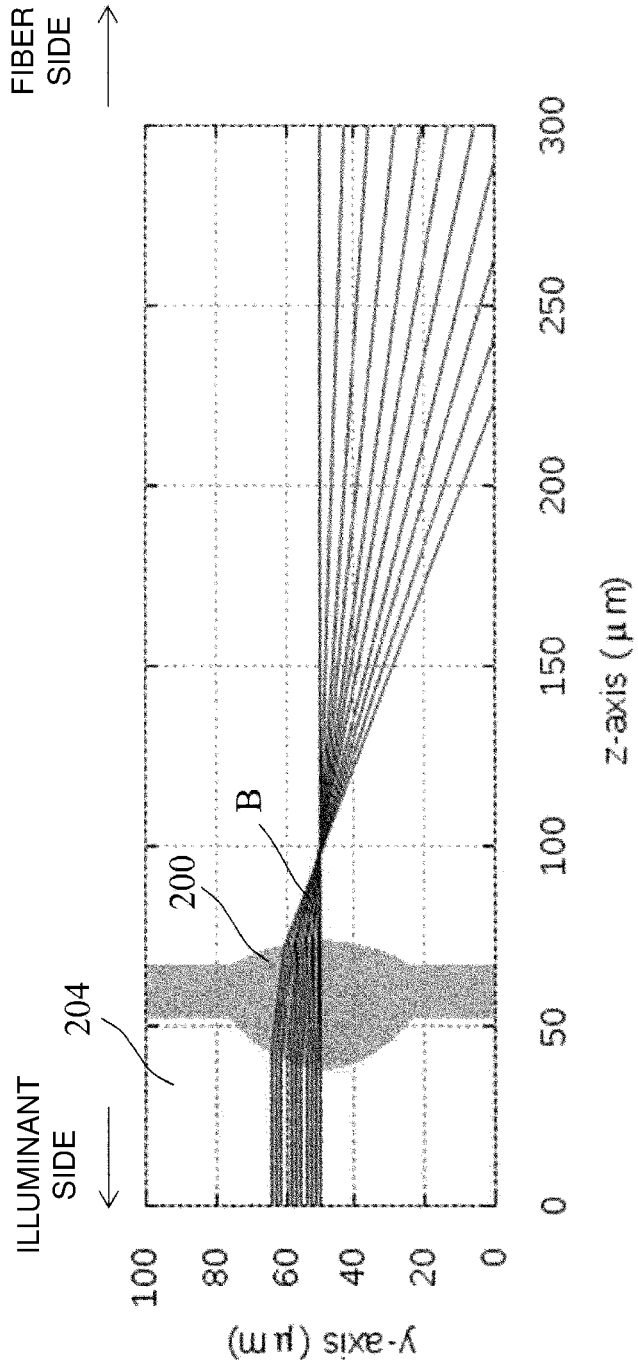
FIG. 6 is a diagram illustrating ray tracing calculation results obtained when collimated light is entered into the lens structure body according to the second embodiment of the present invention.

FIG. 6 is a diagram illustrating ray tracing calculation results obtained when collimated light is entered into the lens structure body 200. Here, the height of the collimated light in the y-axis direction from the optical axis OA is 0 to 15 μm. As indicated by a ray tracing result B, the position of the focal point of the lens structure body 200 in the z-axis direction is around 100 μm.

Figure 7:
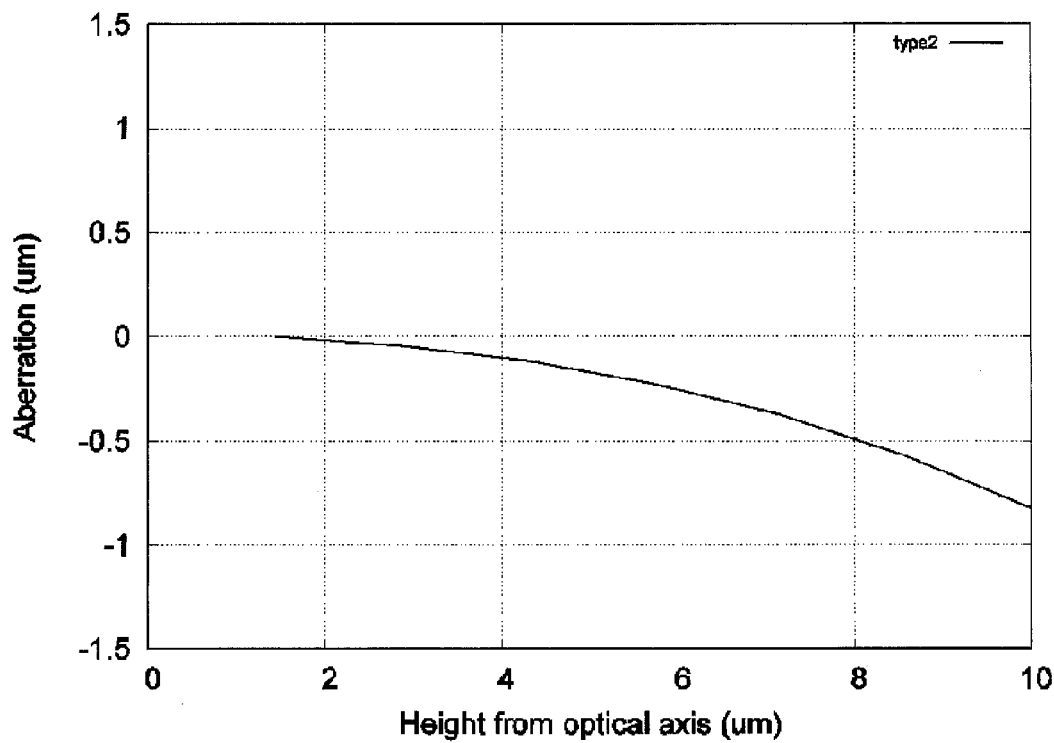
FIG. 7 is a diagram illustrating collimated light height dependency of spherical aberration of the lens structure body according to the second embodiment of the present invention.

FIG. 7 is a diagram illustrating collimated light height (corresponding to the mode field radius of the illuminant) dependency of the spherical aberration of the lens structure body 200, calculated based on the ray tracing calculation results illustrated in FIG. 6. In FIG. 7, the horizontal axis represents the height of the collimated light in the y-axis direction when the optical axis OA is 0 μm, and the vertical axis represents the spherical aberration of the lens structure body 200.

Figure 8:
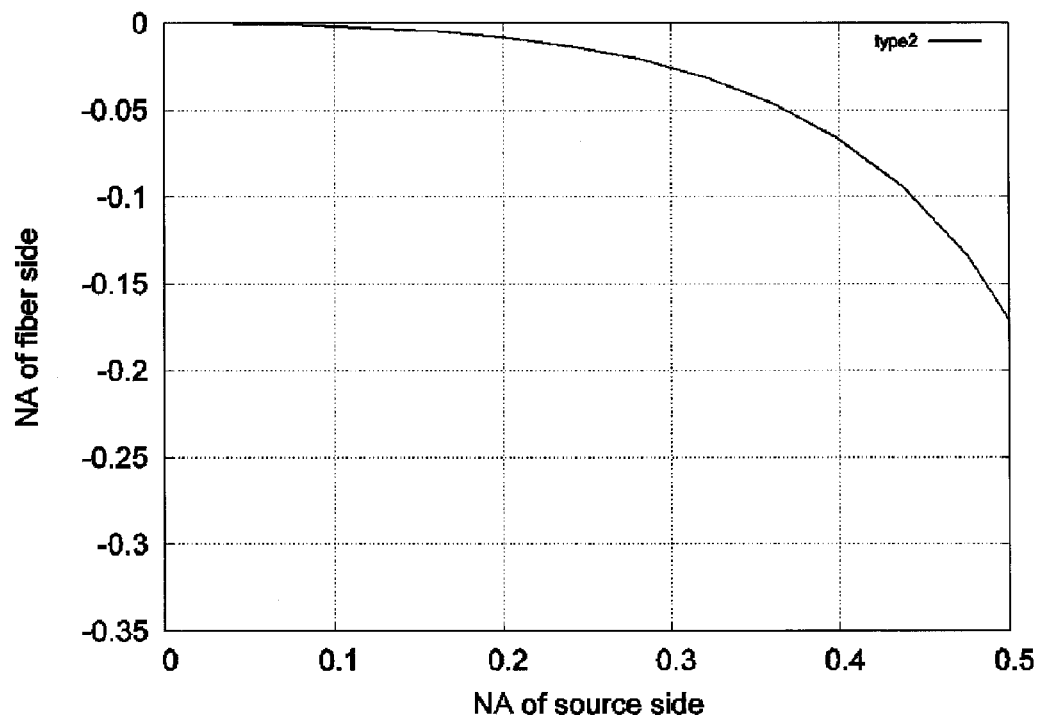
FIG. 8 is a diagram illustrating illuminant-side numerical aperture dependency of fiber-side numerical aperture in the second embodiment of the present invention.

FIG. 8 is a diagram illustrating illuminant-side numerical aperture dependency of fiber-side numerical aperture, calculated based on the ray tracing calculation results illustrated in FIG. 6. In FIG. 8, the horizontal axis represents numerical aperture on the illuminant side, and the vertical axis represents the numerical aperture on the fiber side.

Like the first embodiment, according to the lens structure body 200 of the present embodiment, the spherical aberration and the illuminant-side numerical aperture permissible range can be improved when compared with a ball lens having the same diameter.

Further, in the present embodiment, providing the adhesive layer 204 in contact with the refraction surface 201 can reduce the reflectance between the illuminant-side waveguide and the lens structure body 200, because the adhesive layer 204 is arranged between the illuminant-side waveguide and the lens structure body 200 when the lens structure body 200 is applied to the optical interconnection structure.

In the example illustrated in FIG. 5, although the adhesive layer 204 in contact with the refraction surface 201 is provided, an adhesive layer may be provided so as to cover the microlens portion 205 entirely, as described below, or an adhesive layer in contact with the refraction surface 202 may be provided.

In the lens structure bodies 100 and 200 of the first and second embodiments, if the surfaces of the marker portions 107, 108, 207, and 208 are partly coated with a contrast medium, the positions of the microlens portions 105 and 205 can be detected by computed tomography (CT) or magnetic resonance imaging (MRI). As a result, it is possible to evaluate the misregistration of the lens structure body 100 or 200 after installation in a load environment such as an environment with a large thermal shock (with a sudden temperature change) or a wet heat environment.

Figure 9:
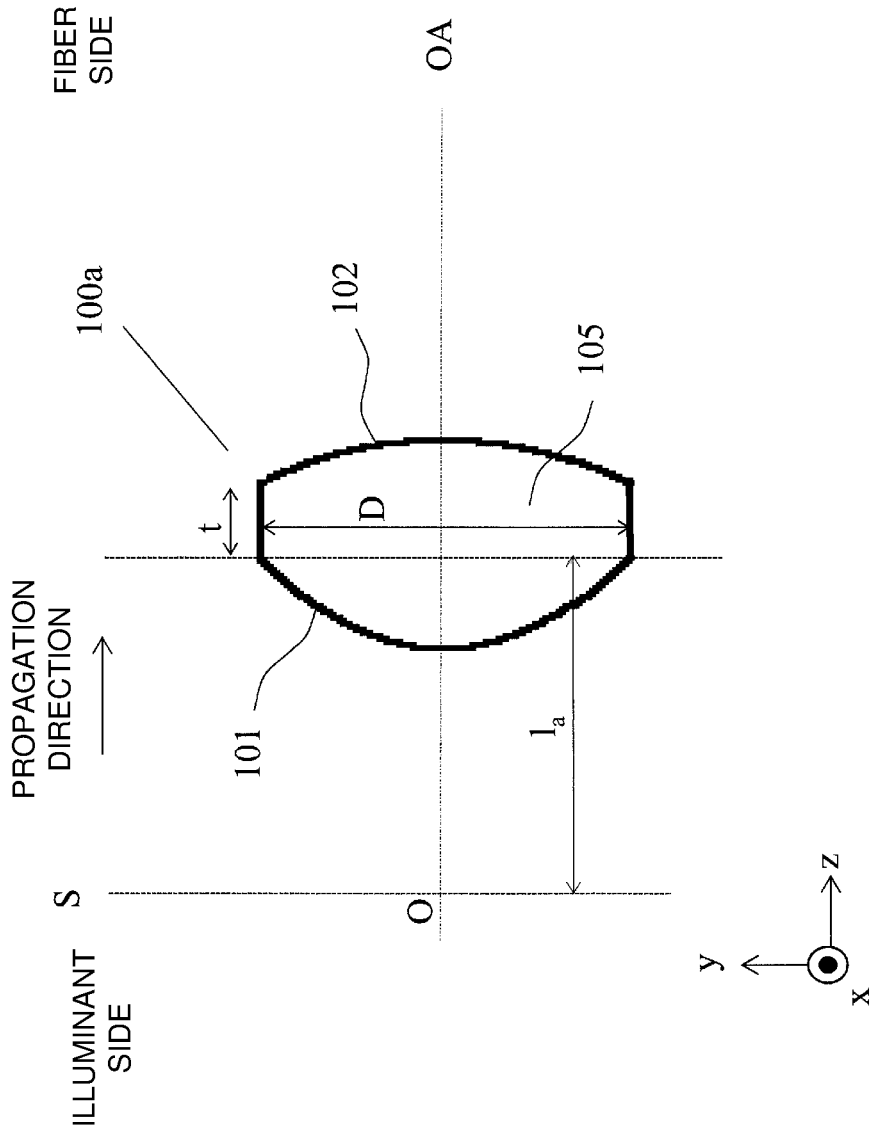
FIG. 9 is a cross-sectional diagram illustrating another shape of the lens structure body according to the first and second embodiments of the present invention.

However, the marker portions 107, 108, 207, and 208 are not essential constituents in embodiments of the present invention. FIG. 9 is a cross-sectional diagram illustrating a lens structure body 100a, in which the marker portions 107, 108, 207, and 208 are not provided.

Further, in the first embodiment, although the marker portions 107 and 108 are provided at both ends of the microlens portion 105 in the direction perpendicular to the optical axis OA, a marker portion may be provided at only one of both ends of the microlens portion 105. Similarly, in the second embodiment, although the marker portions 207 and 208 are provided at both ends of the microlens portion 205 in the direction perpendicular to the optical axis OA, a marker portion may be provided at only one of both ends of the microlens portion 205.

Third Embodiment

Next, a third embodiment of the present invention will be described. The lens structure bodies 100, 100a, and 200 described in the first and second embodiments are basically applied to an optical interconnection structure for coupling a first waveguide that propagates guided light from a semiconductor LD (Laser Diode) illuminant with a second waveguide having a mode field diameter larger than that of the first waveguide. An Si waveguide having an Si core or an InP series or comparable waveguide having a compound semiconductor core is used as the first waveguide. A quartz fiber is mainly used as the second waveguide.

Figure 10:
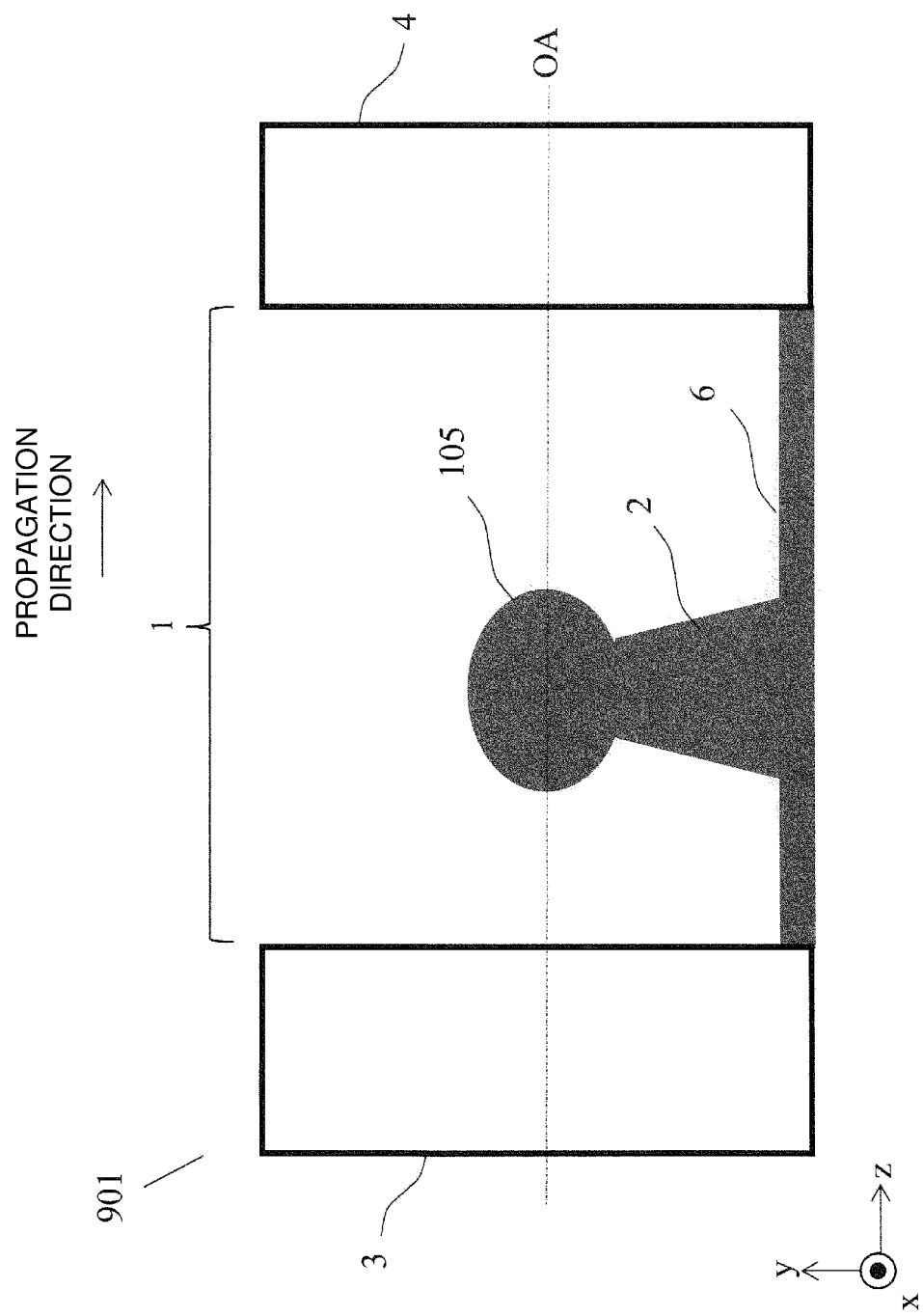
FIG. 10 is a cross-sectional diagram illustrating an optical interconnection structure according to a third embodiment of the present invention.

FIG. 10 is a cross-sectional diagram illustrating an optical interconnection structure 901 on which the lens structure body of the first embodiment is arranged. The optical interconnection structure 901 is configured by a first waveguide 3, a second waveguide 4, and a lens structure body 1 arranged between the first waveguide 3 and the second waveguide 4.

The lens structure body 1 is configured by the microlens portion 105 described in the first embodiment, a substrate 6 arranged between an emission end face of the first waveguide 3 and an incidence end face of the second waveguide 4, and a support member 2 supporting the microlens portion 105 (or the marker portion provided at the microlens portion 105) so that the microlens portion 105 is arranged on the substrate 6 at a distance.

End faces of the substrate 6 are in close contact with an end face of the first waveguide 3 and an end face of the second waveguide 4. For example, an adhesive is used to fix the substrate 6. That is, one end face of the substrate 6 is adhered to the emission end face of the first waveguide 3, and the other end face of the substrate 6 is adhered to the incidence end face of the second waveguide 4. It is desired that the substrate 6 is made of a material whose accuracy in the height direction is controllable in submicron order. A Si substrate is an exemplary material for the substrate 6, although a glass substrate may be used depending on the accuracy.

Using the substrate 6 as a shaping substrate, the support member 2 and the microlens portion 105 are successively formed on the substrate 6 by an optical shaping device. Like the microlens portion 105, the support member 2 is formed of a photocurable resin material. To firmly fix the microlens portion 105, it is desired that the support member 2 has a truncated shape so that its cross section increases as approaching the substrate 6. The space surrounding the microlens portion 105 between the first waveguide 3 and the second waveguide 4 is filled with air or an inert gas.

Figure 11:
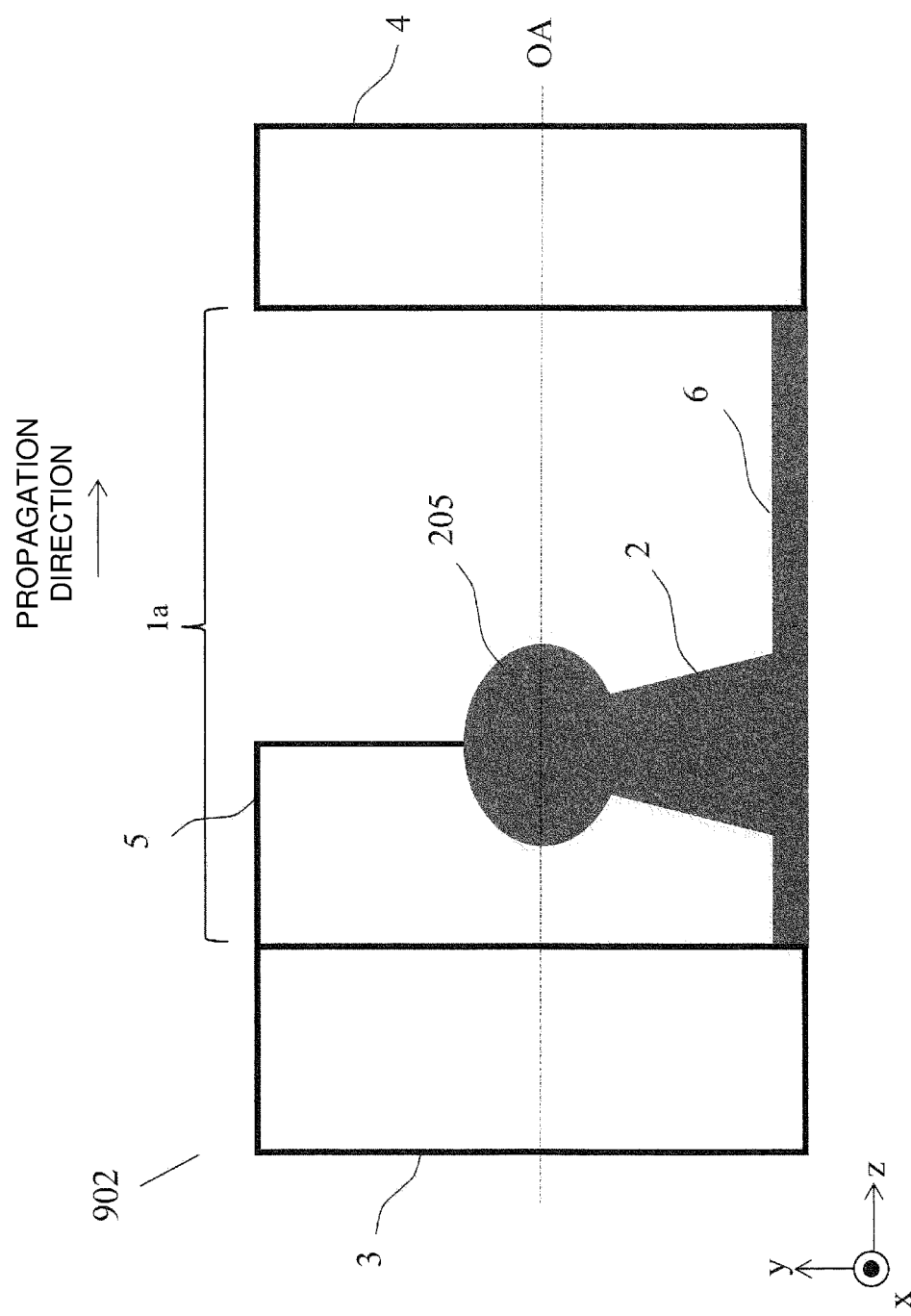
FIG. 11 is a cross-sectional diagram illustrating another optical interconnection structure according to the third embodiment of the present invention.
Figure 12:
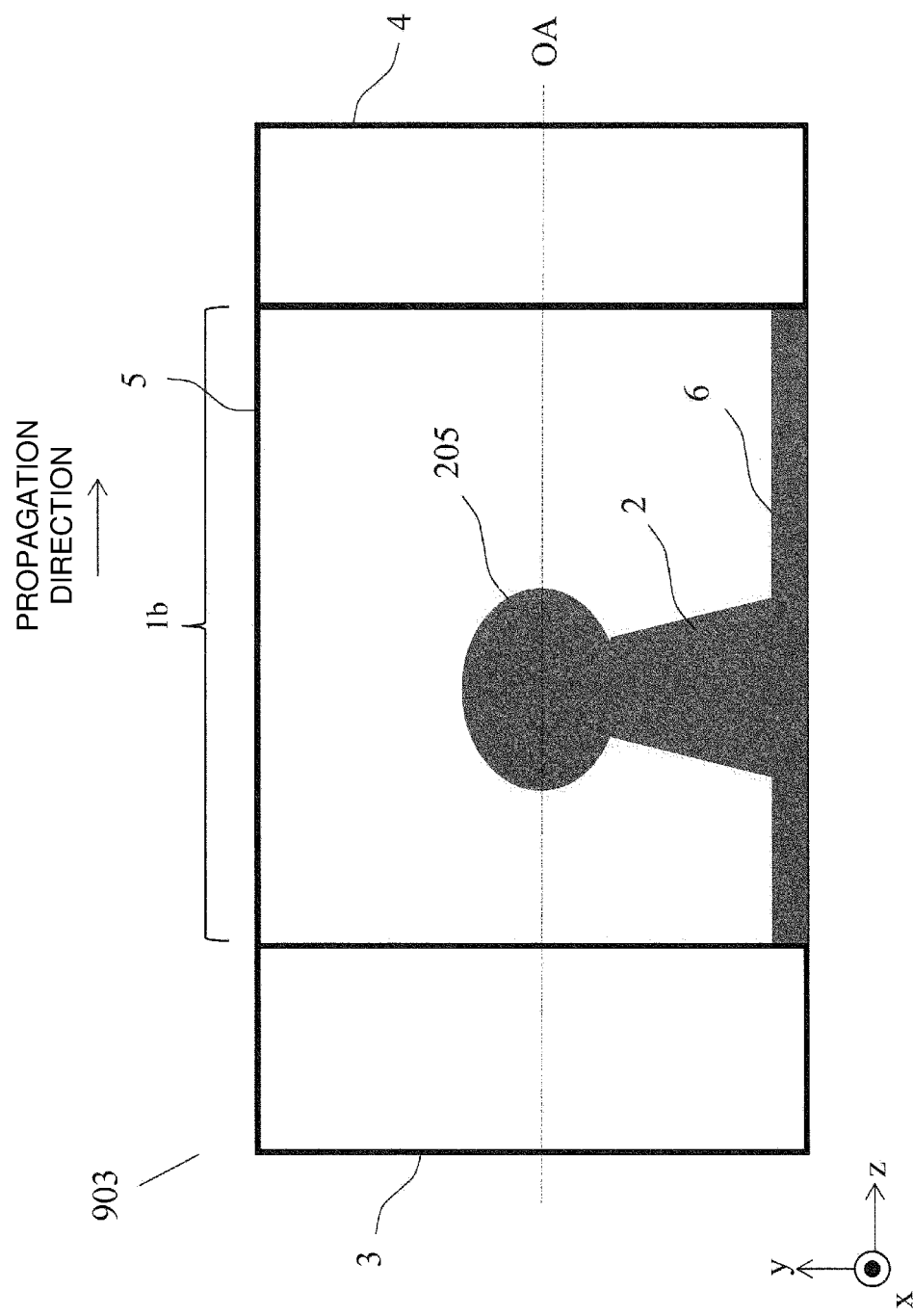
FIG. 12 is a cross-sectional diagram illustrating another optical interconnection structure according to the third embodiment of the present invention.
Figure 13:
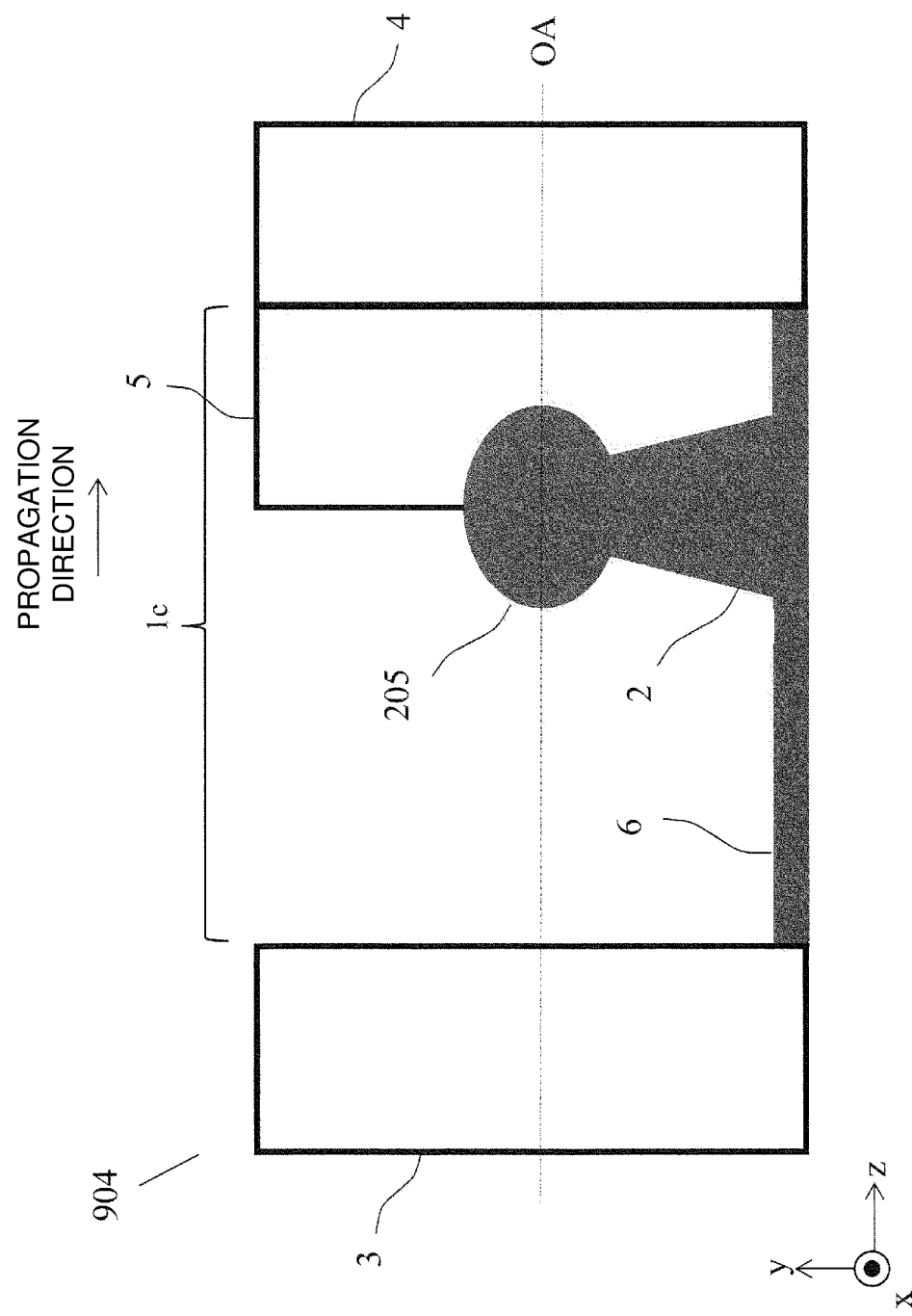
FIG. 13 is a cross-sectional diagram illustrating another optical interconnection structure according to the third embodiment of the present invention.

FIGS. 11 to 13 illustrate other examples of the optical interconnection structure of the present embodiment. FIG. 11 is a cross-sectional diagram illustrating an optical interconnection structure 902 in which the space between the lens structure body and the first waveguide 3 is filled with a resin adhesive 5 (that is a light transmissive member and is the adhesive layer 204 of the second embodiment). FIG. 12 is a cross-sectional diagram illustrating an optical interconnection structure 903 in which the space surrounding the microlens portion 105 between the first waveguide 3 and the second waveguide 4 is filled with the resin adhesive 5. FIG. 13 is a cross-sectional diagram illustrating an optical interconnection structure 904 in which the space between the lens structure body and the second waveguide 4 is filled with the resin adhesive 5.

Each of the lens structure bodies 1a, 1b, and 1c illustrated in FIG. 11 to FIG. 13 is configured by the microlens portion 205 described in the second embodiment, the substrate 6, and the support member 2 supporting the microlens portion 205 (or the marker portion provided at the microlens portion 205).

As described in the second embodiment, the refractive index of the resin adhesive 5 is smaller than the refractive index of the microlens portion 205. As the difference between the refractive index of the microlens portion 205 and the refractive index of the resin adhesive 5 decreases, it is necessary to increase the connection distance between the first waveguide 3 and the second waveguide 4.

In designing the lens structure bodies 1, and 1a to 1c, the origin O described in the first and second embodiments can be set at an arbitrary point on the optical axis OA in the first waveguide 3.

Further, although the marker portions 107, 108, 207, and 208 are not illustrated in FIGS. 10 to 13, it is needless to say that the marker portions 107, 108, 207, and 208 can be formed at the microlens portions 105 and 205 as described in the first and second embodiments.

Further, instead of directly fixing the microlens portions 105 and 205 with the support member 2, the marker portion 108 or 208 (or the marker portion 107 or 207) may be integrally formed with the support member 2 for fixing the microlens portions 105 and 205.

Figure 14:
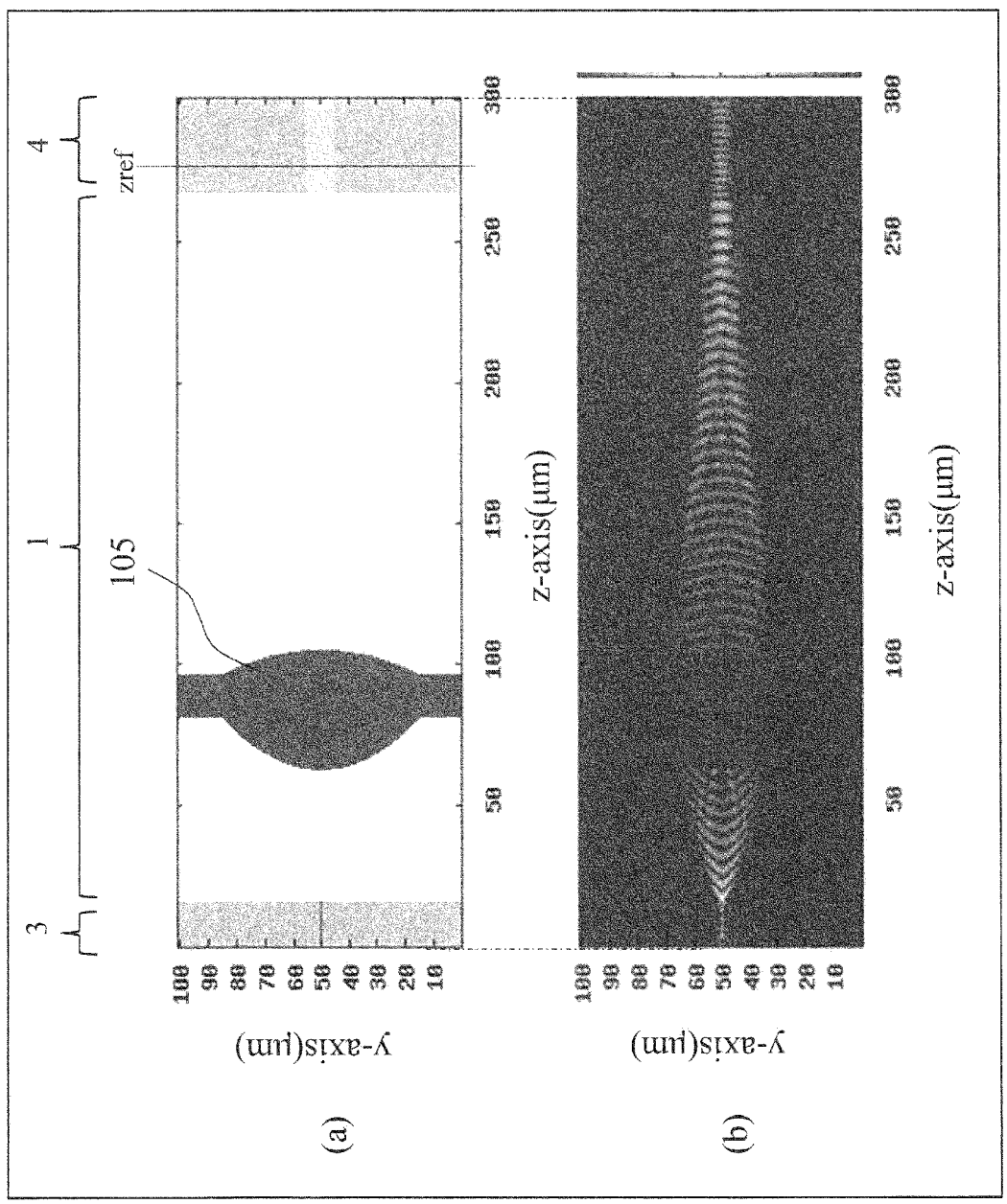
FIG. 14 is a cross-sectional diagram illustrating an optical interconnection structure according to the third embodiment of the present invention and a normalized power distribution of the optical interconnection structure.

Part (a) of FIG. 14 is a cross-sectional diagram (corresponding to FIG. 1) illustrating the optical interconnection structure 901 of the present embodiment, and part (b) of FIG. 14 is a diagram illustrating a normalized power distribution $|E|^2$ of the optical interconnection structure 901 (in which E is electric field). In the example illustrated in FIG. 14, the first waveguide 3 is an embedded Si waveguide and the second waveguide 4 is a quartz fiber. In the emission light from the first waveguide 3, the mode field diameter of the 0th order mode is 4 μm and the core diameter of the second waveguide 4 (the quartz fiber) is 10 μm.

Further, it is permitted that the emission light from the first waveguide 3 includes a plurality of the radiation modes of about 0.3 or less in terms of numerical aperture. The parameters used in the first embodiment are applied to the lens structure body 1. The space surrounding the microlens portion 105 between the first waveguide 3 and the second waveguide 4 is filled with air (refractive index 1.0). The propagation wavelength is 1.55 μm.

Figure 15:
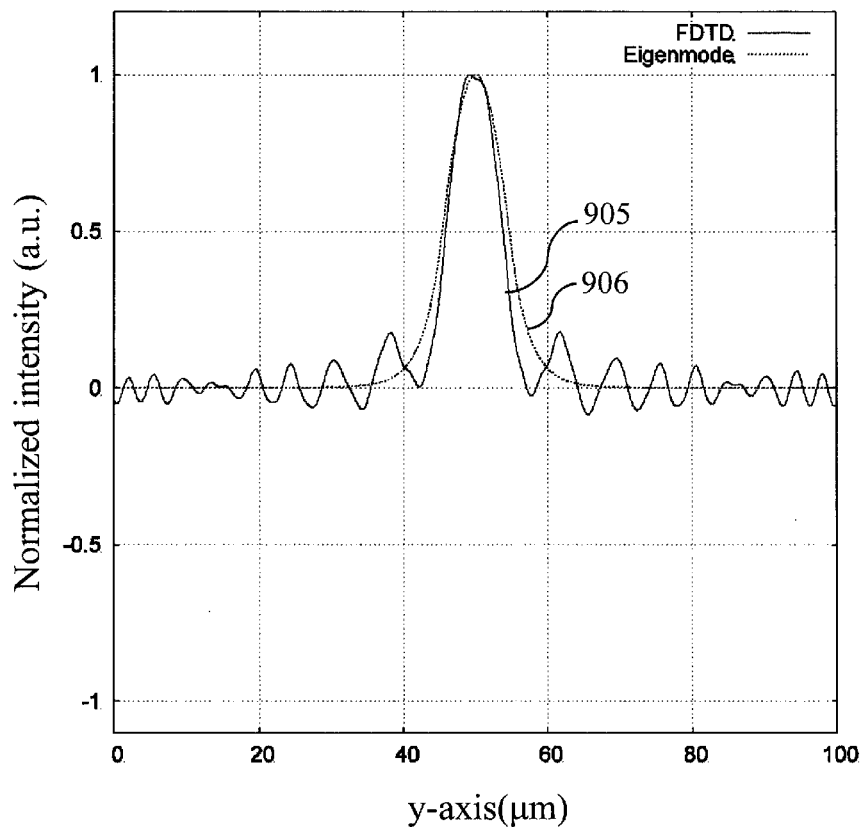
FIG. 15 is a diagram illustrating a representative mode in a fiber plane of the optical interconnection structure illustrated in FIG. 14.

FIG. 15 is a diagram illustrating a representative mode in a fiber plane of the optical interconnection structure 901, calculated based on the guided wave distribution in FIG. 14(b). In FIG. 15, indicated are a propagation mode light intensity distribution 905 at z-coordinate zref=292 μm on a reference plane and a 0th-order eigenmode light intensity distribution 906 at zref=292 μm.

Figure 16:
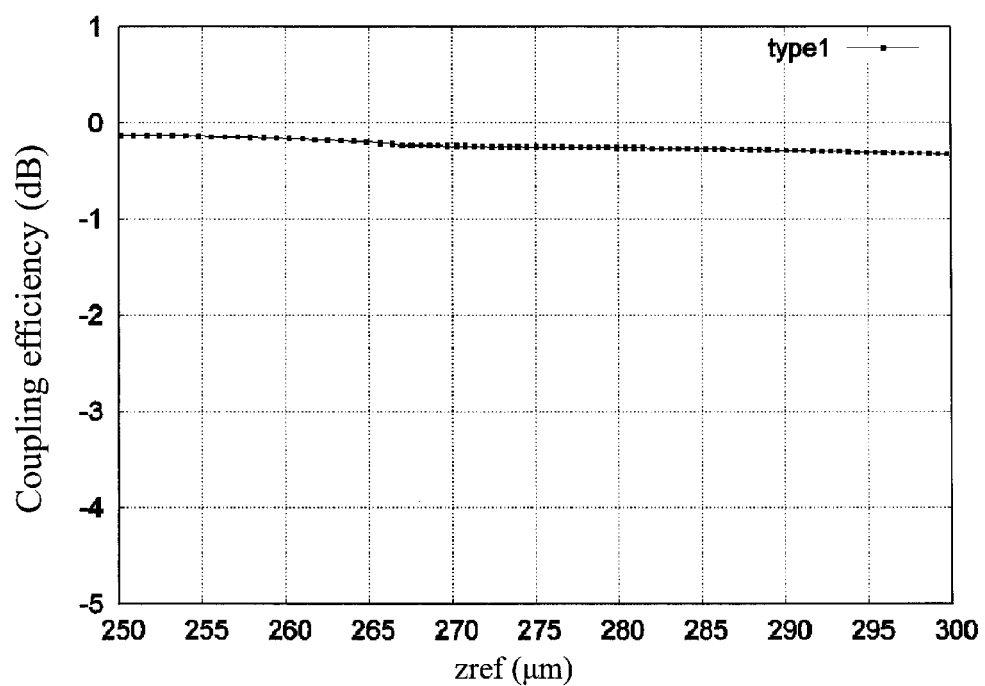
FIG. 16 is a diagram illustrating reference plane position dependency in coupling efficiency of the optical interconnection structure illustrated in FIG. 14.

FIG. 16 is a diagram illustrating reference plane position dependency in coupling efficiency of the optical interconnection structure 901, calculated based on the guided wave distribution in FIG. 14(b). Here, the z-coordinate zref of the reference plane is swept from the vicinity of the fiber end face in the light propagation direction.

According to FIG. 16, in a range from the vicinity of the fiber end face (the position where zref is 250 μm) to a position separated by approximately 50 μm (zref=300 m) in the light propagation direction, it is understood that the coupling efficiency between the first waveguide 3 and the second waveguide 4 is equal to or greater than −0.5 dB. According to the optical interconnection structure 901 of the present embodiment, when compared with the conventional optical interconnection structure illustrated in FIG. 21(a), the coupling efficiency between the first waveguide 3 and the second waveguide 4 can be improved because the radiation mode in propagation in the second waveguide 4 can be suppressed.

Figure 17:
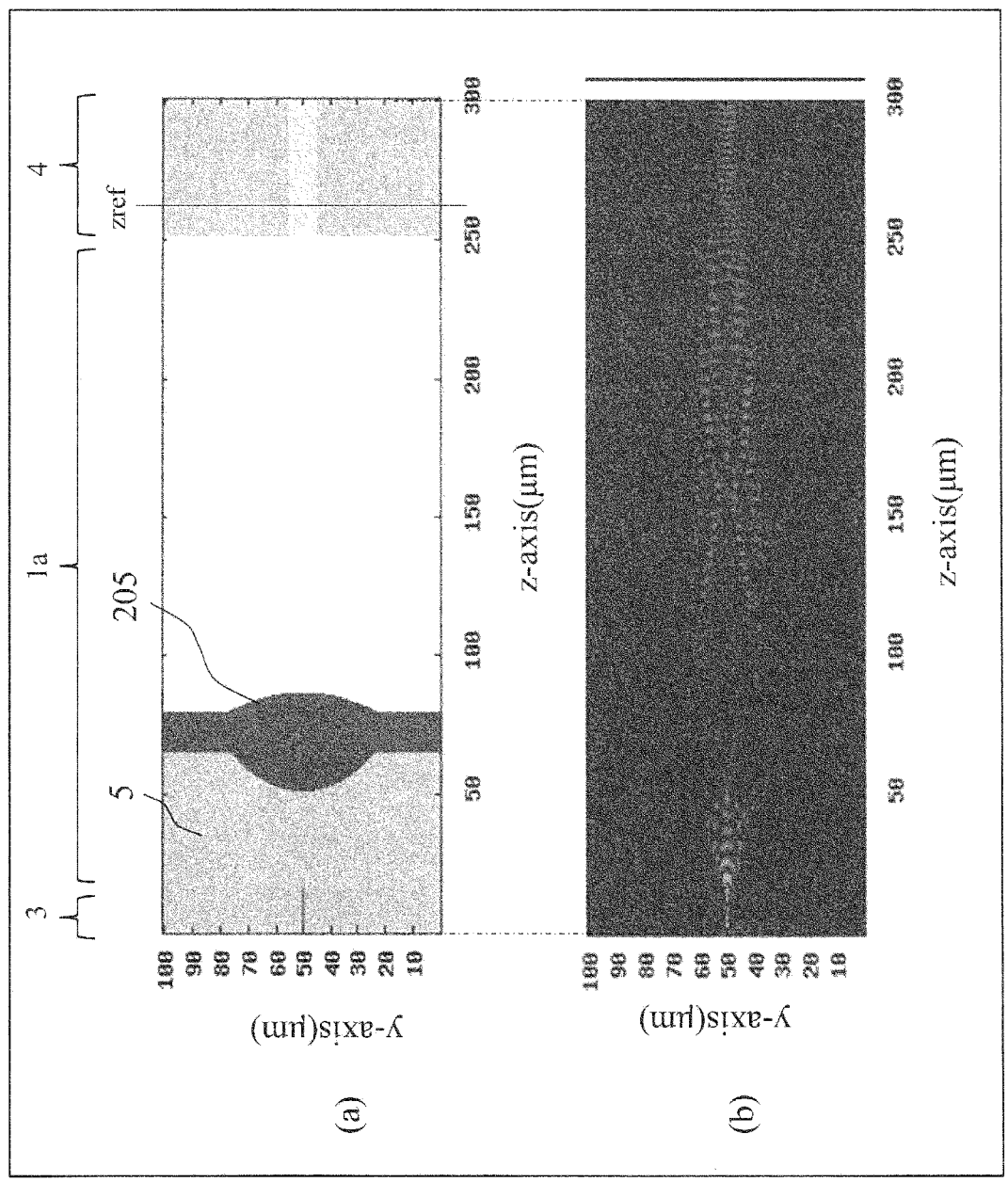
FIG. 17 is a cross-sectional diagram illustrating an optical interconnection structure according to the third embodiment of the present invention and a normalized power distribution of the optical interconnection structure.

Part (a) of FIG. 17 is a cross-sectional diagram (corresponding to FIG. 11) illustrating the optical interconnection structure 902 of the present embodiment, and part (b) of FIG. 17 is a diagram illustrating normalized power distribution $|E|^2$ of the optical interconnection structure 902 (in which E is electric field). In the example illustrated in FIG. 17, the first waveguide 3 is an embedded Si waveguide and the second waveguide 4 is a quartz fiber, as in the example illustrated in FIG. 14. The parameters used in the second embodiment are applied to the lens structure body 1a. The space between the first waveguide 3 and the microlens portion 205 is filled with the resin adhesive 5 (refractive index 1.3).

Figure 18:
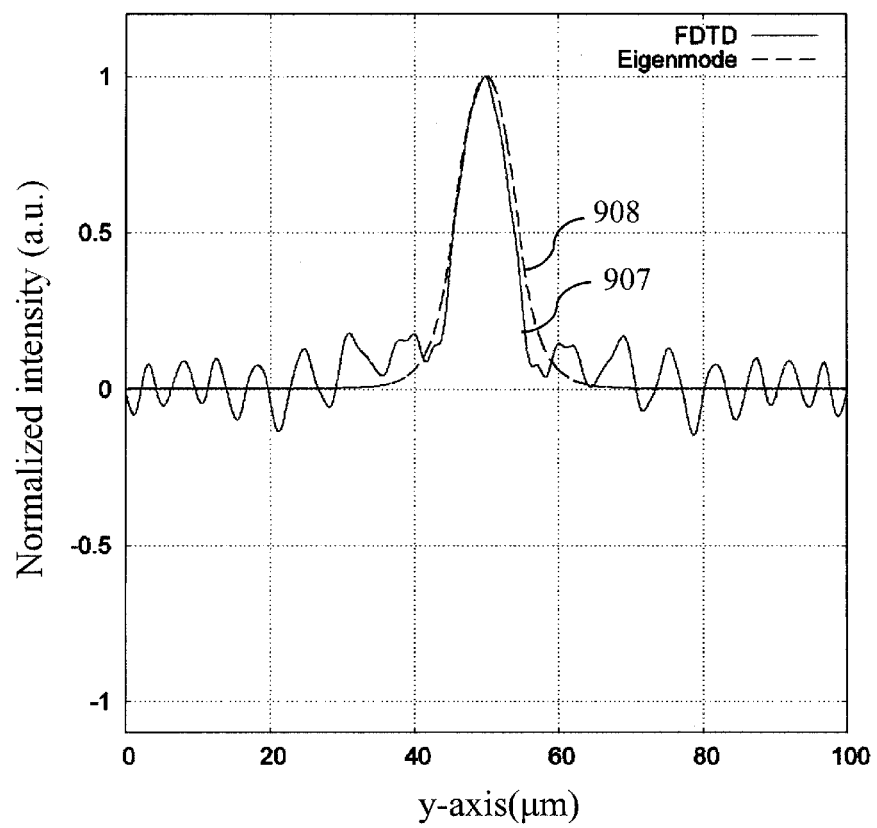
FIG. 18 is a diagram illustrating a representative mode in a fiber plane of the optical interconnection structure illustrated in FIG. 17.

FIG. 18 is a diagram illustrating a representative mode in a fiber plane of the optical interconnection structure 902, calculated based on the guided wave distribution illustrated in FIG. 17(b). In FIG. 18, indicated are a propagation mode light intensity distribution 907 at z-coordinate zref=285 μm on the reference plane and a 0th-order eigenmode light intensity distribution 908 at zref=285 μm.

Figure 19:
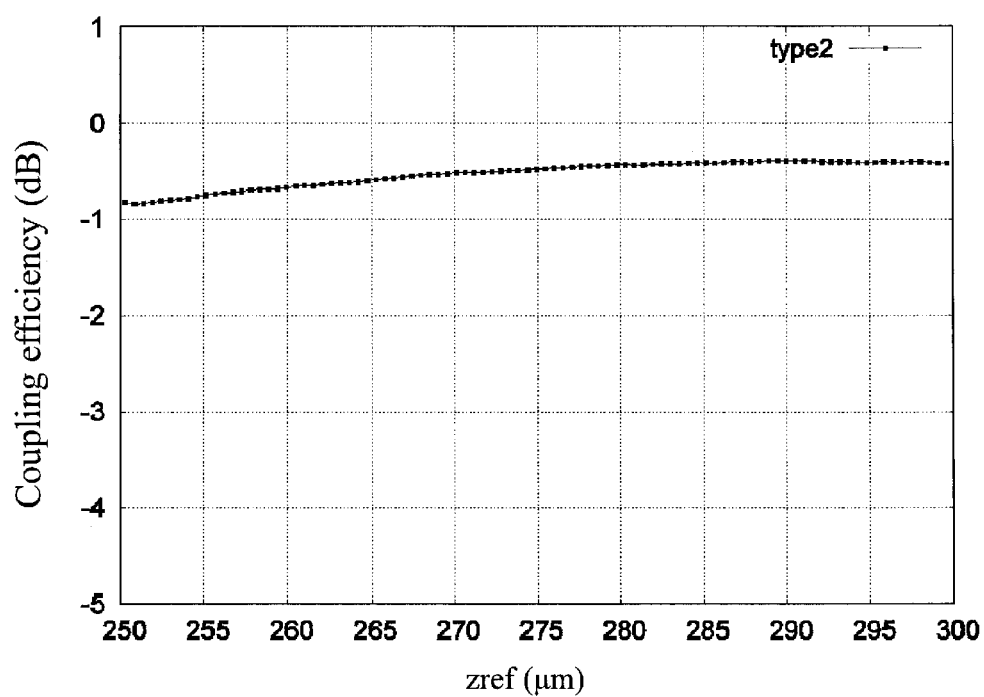
FIG. 19 is a diagram illustrating reference plane position dependency in coupling efficiency of the optical interconnection structure illustrated in FIG. 17.

FIG. 19 is a diagram illustrating reference plane position dependency in coupling efficiency of the optical interconnection structure 902 calculated based on the guided wave distribution in FIG. 17(b). Here, the z-coordinate zref of the reference plane is swept from the vicinity of the fiber end face in the light propagation direction.

According to FIG. 19, in a range from the vicinity of the fiber end face (the position where zref is 250 μm) to a position separated by approximately 50 μm (zref=300 μm) in the light propagation direction, it is understood that the coupling efficiency between the first waveguide 3 and the second waveguide 4 is equal to or greater than −1.0 dB. According to the optical interconnection structure 902 of the present embodiment, when compared with the optical interconnection structure 901, the radiation mode suppression effect and the coupling efficiency are slightly deteriorated. On the other hand, according to the optical interconnection structure 902, the reflectance between the first waveguide 3 and the microlens portion 205 can be reduced by refractive index matching by the resin adhesive 5 between the first waveguide 3 and the microlens portion 205.

Figure 21:
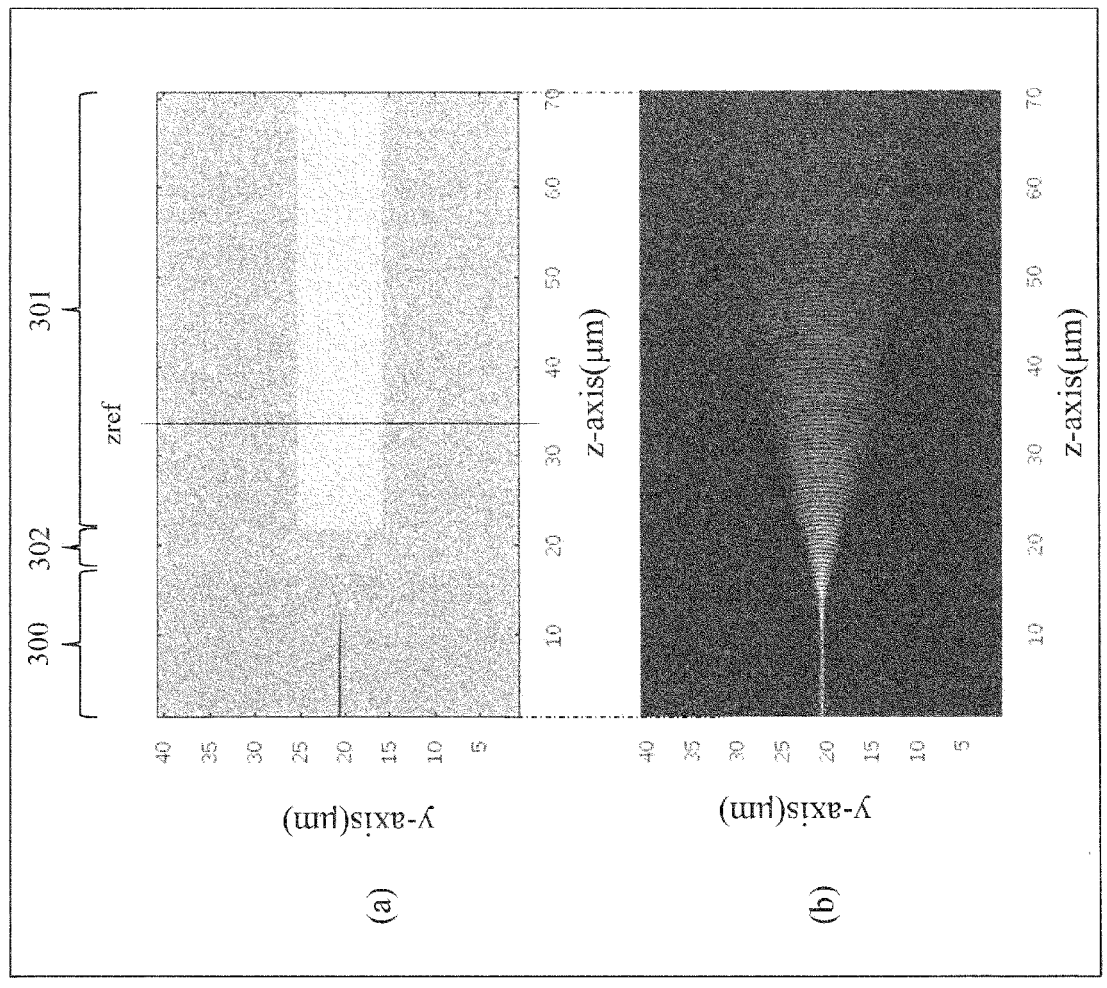
FIG. 21 is a cross-sectional diagram illustrating a conventional optical interconnection structure and a normalized power distribution of the optical interconnection structure.
Figure 22:
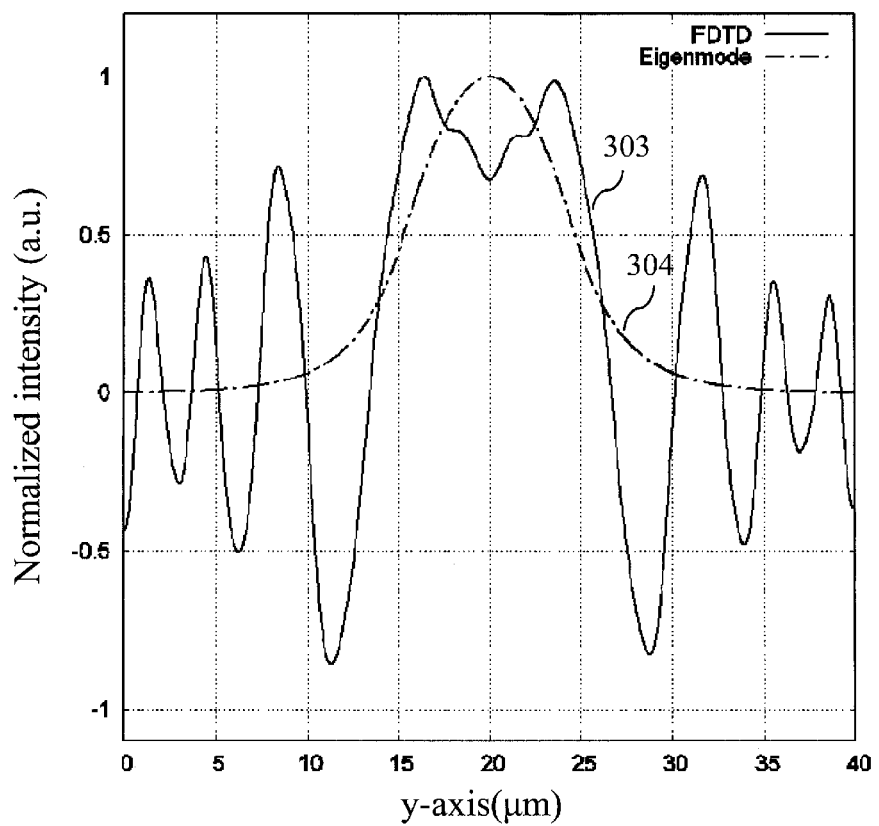
FIG. 22 is a diagram illustrating a representative mode in a fiber plane of the optical interconnection structure illustrated in FIG. 21.
Figure 23:
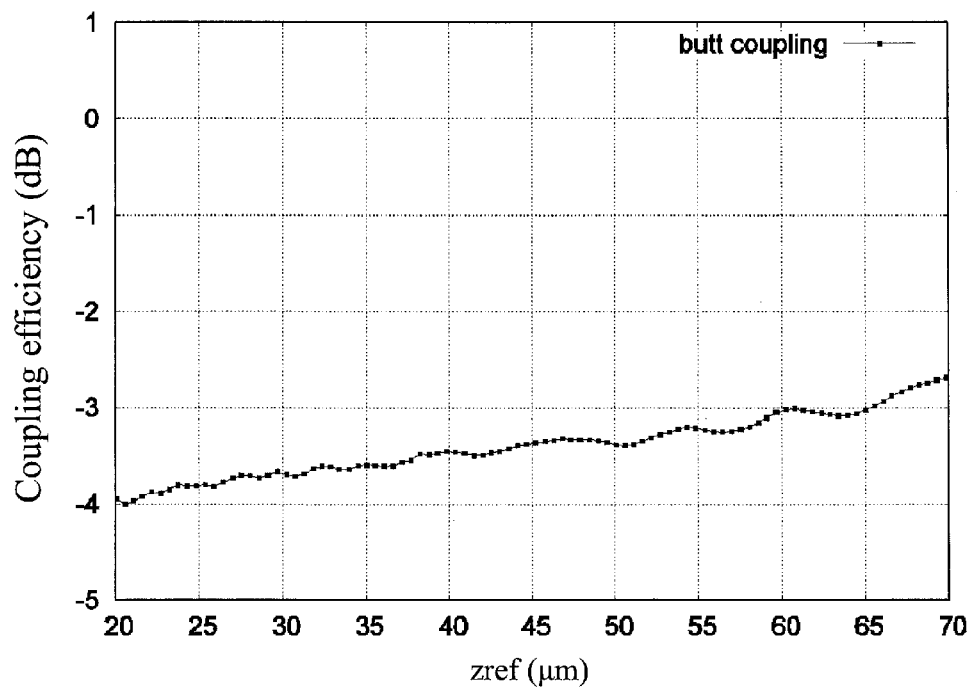
FIG. 23 is a diagram illustrating reference plane position dependency in coupling efficiency of the optical interconnection structure illustrated in FIG. 21.

The optical interconnection structures 903 and 904 differ from the optical interconnection structures 901 and 902 in the filing form of the resin adhesive 5, but the radiation mode suppression effect and the coupling efficiency can be improved compared with the conventional optical interconnection structure illustrated in FIG. 21(a). In the optical interconnection structure 903, the reflectance reduction effect can be obtained between the first waveguide 3 and the microlens portion 205, and between the microlens portion 205 and the second waveguide 4. Further, in the optical interconnection structure 904, the reflectance reduction effect can be obtained between the microlens portion 205 and the second waveguide 4.

As mentioned above, in the present embodiment, since ray tracing characteristics can be selected according to the shape of the lens structure body and the filing form of the resin adhesive 5, the characteristics of the lens structure body can be selected according to MFC incompleteness of the first waveguide 3.

In the present embodiment, although the described optical interconnection structure includes the single first waveguide 3, the single lens structure body, and the single second waveguide 4, embodiments of the present invention may be applied to an optical interconnection structure in which the first waveguide and the second waveguide are waveguide arrays.

Figure 20:
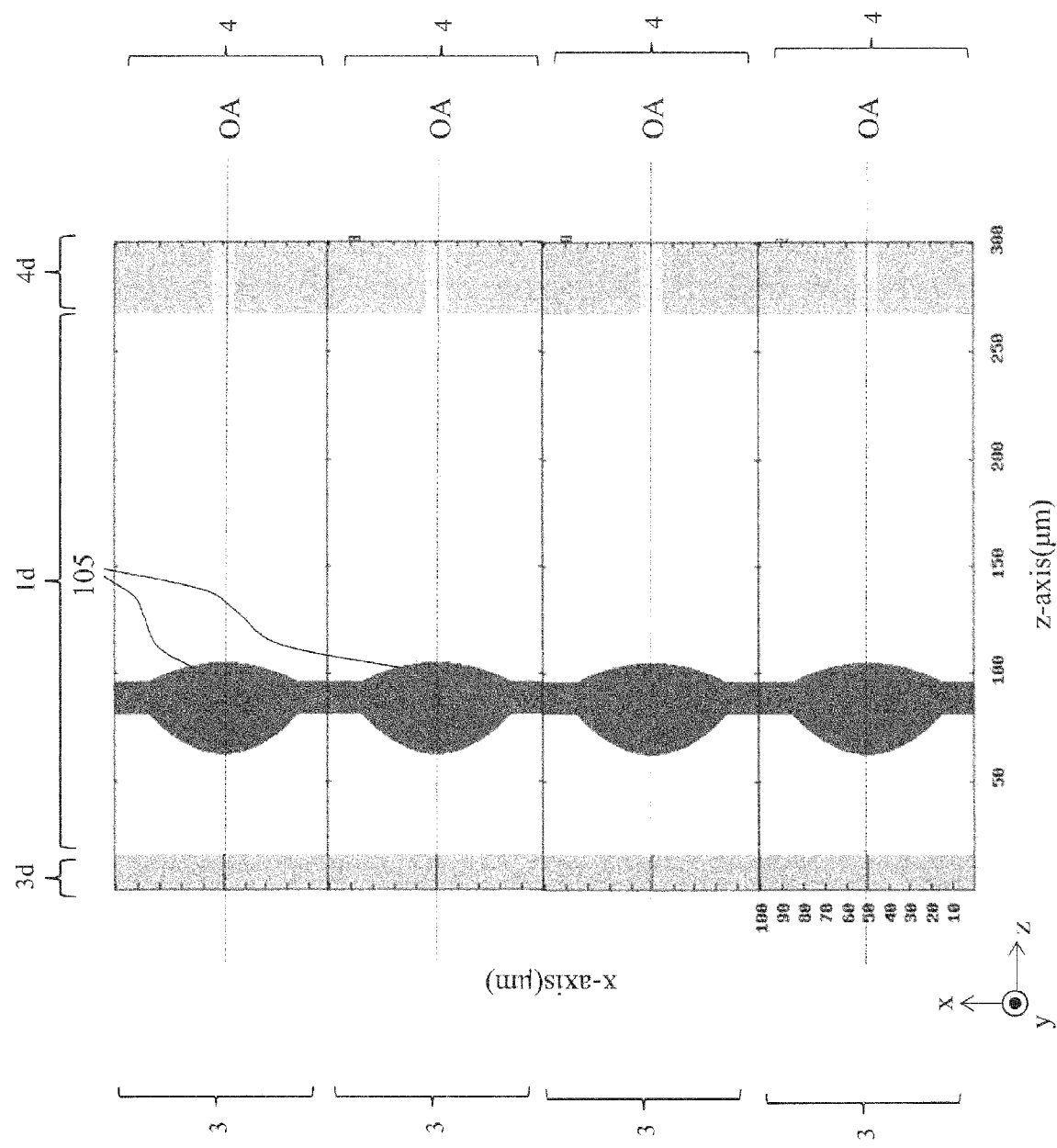
FIG. 20 is a plan view of an optical interconnection structure of an array structure according to the third embodiment of the present invention.

FIG. 20 is a plan view of an optical interconnection structure having an array structure. As illustrated in FIG. 20, a waveguide array 3d is constituted by a plurality of first waveguides 3 arranged side by side in the x-axis. Similarly, a waveguide array 4d is constituted by a plurality of second waveguides 4 arranged side by side in the x-axis.

A lens structure body 1d is constituted by a plurality of microlens portions 105 arranged side by side in the x-axis. The method for fixing the microlens portion 105 is as described in the present embodiment.

Although the example illustrated in FIG. 20 includes the plurality of microlens portions 105 arranged side by side, a plurality of microlens portions 205 may be arranged side by side. Further, it is needless to say that the space between the microlens portion 205 and at least one of the waveguide array 3d and the waveguide array 4d may be appropriately filled with the resin adhesive 5.

INDUSTRIAL APPLICABILITY

Embodiments of the present invention can be applied to a technique for coupling optical waveguides mutually different in mode field diameter.

REFERENCE SIGNS LIST

1, 1a to 1d, 100, 100a, 200 lens structure body
2 support member
3 first waveguide
3d, 4d waveguide array
4 second waveguide
5 resin adhesive
6 substrate
101, 102, 201, 202 refraction surface
103a, 103b, 106a, 106b, 203a, 203b, 206a, 206b non-refractive surface
105, 205 microlens portion
107, 108, 207, 208 marker portion
204 adhesive layer
901 to 904 optical interconnection structure

The invention claimed is:
1. A lens structure body comprising:
a lens portion having a first refraction surface on an illuminant side and a second refraction surface on an emission side so as to be opposed to the first refraction surface, wherein:
the first refraction surface satisfies

$$z = z_c - r_{b1}\sqrt{1 - \left(\frac{y}{r_{a1}}\right)^2}$$

$$z_c = l_a + r_{b1}\sqrt{1 - \left(\frac{0.5D}{r_{a1}}\right)^2}$$

$$1.6D < r_{a1} < 2.1D$$

$$6.0D < r_{b1} < 7.4D;$$

and
the second refraction surface satisfies $$z = z_c + r_{b2}\sqrt{1 - \left(\frac{y}{r_{a2}}\right)^2}$$

$$z_c = l_a + t - r_{b2}\sqrt{1 - \left(\frac{0.5D}{r_{a2}}\right)^2}$$

$$1.8D < r_{a2} < 2.2D$$

$$3.6D < r_{b2} < 4.4D,$$

in which z represents a coordinate in a light propagation direction, y represents a coordinate in a height direction perpendicular to an optical axis of the lens portion, D represents a size of the lens portion in a height direction, $l_a$ represents a distance from a predetermined origin to an end of the first refraction surface in the light propagation direction, t represents a distance from the end of the first refraction surface to an end of the second refraction surface in the light propagation direction, $r_{a1}$ represents a radius of the first refraction surface in the height direction, $r_{b1}$ represents the radius of the first refraction surface in the light propagation direction, $r_{a2}$ represents a radius of the second refraction surface in the height direction, and $r_{b2}$ represents the radius of the second refraction surface in the light propagation direction.

2. The lens structure body according to claim 1, further comprising a marker portion joined to at least one of the ends of the lens portion in a direction perpendicular to the optical axis.

3. The lens structure body according to claim 2, wherein at least a part of the marker portion is coated with a contrast medium.

4. The lens structure body according to claim 1, further comprising:
a substrate; and
a support member on the substrate and configured to support the lens portion so that the lens portion is arranged on the substrate at a distance.

5. An optical interconnection structure comprising:
a first waveguide;
a second waveguide receiving light from the first waveguide; and
a lens structure body arranged between an emission surface of the first waveguide and an incidence surface of the second waveguide, the lens structure body comprising:
a lens portion having a first refraction surface on an illuminant side and a second refraction surface on an emission side so as to be opposed to the first refraction surface;
a substrate; and
a support member on the substrate, the support member configured to support the lens portion so that the lens portion is arranged on the substrate at a distance;
wherein a first end face of the substrate of the lens structure body is in contact with an emission end face of the first waveguide, and a second end face of the substrate is in contact with an incidence end face of the second waveguide;
wherein the first refraction surface satisfies $$z = z_c - r_{b1}\sqrt{1 - \left(\frac{y}{r_{a1}}\right)^2}$$

$$z_c = l_a + r_{b1}\sqrt{1 - \left(\frac{0.5D}{r_{a1}}\right)^2}$$

$$1.6D < r_{a1} < 2.1D$$

$$6.0D < r_{b1} < 7.4D;$$

wherein the second refraction surface satisfies $$z = z_c + r_{b2}\sqrt{1 - \left(\frac{y}{r_{a2}}\right)^2}$$

$$z_c = l_a + t - r_{b2}\sqrt{1 - \left(\frac{0.5D}{r_{a2}}\right)^2}$$

$$1.8D < r_{a2} < 2.2D$$

$$3.6D < r_{b2} < 4.4D;$$

and
wherein z represents a coordinate in a light propagation direction, y represents a coordinate in a height direction perpendicular to an optical axis of the lens portion, D represents a size of the lens portion in a height direction, $l_a$ represents a distance from a predetermined origin to an end of the first refraction surface in the light propagation direction, t represents a distance from the end of the first refraction surface to an end of the second refraction surface in the light propagation direction, $r_{a1}$ represents a radius of the first refraction surface in the height direction, $r_{b1}$ represents the radius of the first refraction surface in the light propagation direction, $r_{a2}$ represents a radius of the second refraction surface in the height direction, and $r_{b2}$ represents the radius of the second refraction surface in the light propagation direction.

6. The optical interconnection structure according to claim 5, wherein the second waveguide has a mode field diameter larger than that of the first waveguide.

7. The optical interconnection structure according to claim 5, further comprising a light transmissive member having a refractive index smaller than that of the lens portion, wherein a space between at least one of the first waveguide and the second waveguide and the lens portion of the lens structure body is filled with the light transmissive member.

8. The optical interconnection structure according to claim 7, wherein the light transmissive member is a resin adhesive.

* * * * *